United States Patent [19]
Wooldridge et al.

[11] 3,875,149
[45] Apr. 1, 1975

[54] OXIMES OF 1-(ORTHO-ACYL-PHENOXY)-2-HYDROXY-3-AMINOPROPANES

[75] Inventors: Kenneth Robert Harry Wooldridge, Brentwood; Berkeley Basil, Highwood near Chelmsford, both of England

[73] Assignee: May & Baker Limited, Dagenham, Essex, England

[22] Filed: Dec. 19, 1972

[21] Appl. No.: 316,508

Related U.S. Application Data

[63] Continuation-in-part of Ser. No. 204,682, Dec. 3, 1971, abandoned, which is a continuation-in-part of Ser. No. 130,793, April 2, 1971, abandoned, which is a continuation-in-part of Ser. No. 729,394, May 15, 1968, abandoned.

[30] Foreign Application Priority Data

May 16, 1967 United Kingdom............ 22735/67
Dec. 22, 1967 United Kingdom............ 58516/67

[52] U.S. Cl............ 260/240 G, 424/248, 424/327, 260/247.5 C, 260/348 R, 260/566 A, 260/570.7
[51] Int. Cl..................... C07d 87/38, C07c 131/00
[58] Field of Search...... 260/240 G, 566 A, 247.5 R

[56] References Cited
UNITED STATES PATENTS 2,774,766 12/1956 Goldberg et al........... 260/293.80 X
3,732,277 5/1973 Koppe et al...................... 260/465 E

OTHER PUBLICATIONS

Takahashi et al. I, Chemical Abstracts, Vol. 44, Cols. 1931 to 1932 (1950).
Takahashi et al. II, Chemical Abstracts, Vol. 46, Cols. 455 to 456 (1952).
Dat-Xuong et al., Chemical Abstracts, Vol. 62, Col. 2148 (1965).

*Primary Examiner*—John D. Randolph
*Attorney, Agent, or Firm*—Stevens, Davis, Miller & Mosher

[57] ABSTRACT

Oximes of the formula:

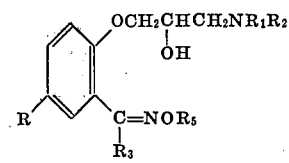

wherein R is hydrogen or phenyl, $R_1$ is hydrogen, alkyl of up to 6 carbon atoms, or hydroxyalkyl of up to 6 carbon atoms, $R_2$ is alkyl of up to 6 carbon atoms, or hydroxyalkyl of up to 6 carbon atoms, or $R_1$ and $R_2$ together with the nitrogen to which they are attached represent morpholino, $R_3$ is hydrogen, or alkyl of up to 6 carbon atoms, and $R_5$ is hydrogen or phenylalkyl of up to 6 carbon atoms in the alkyl residue, and non-toxic acid addition salts thereof, possess pharmacodynamic properties of value in the treatment of prophylaxis of various cardiac disorders, especially cardiac arrhythmias.

13 Claims, No Drawings

OXIMES OF 1-(ORTHO-ACYL-PHENOXY)-2-HYDROXY-3-AMINOPROPANES

This application is a Continuation-in-Part of Ser. No. 204,682, filed Dec. 3, 1971, and now abandoned, which is a Continuation-in-Part of Ser. No. 130,793, filed Apr. 2, 1971, now abandoned, itself a Continuation-in-Part of Ser. No. 729,394, filed May 15, 1968, and now abandoned.

This invention relates to new benzene derivatives, to processes for their preparation and to pharmaceutical compositions containing them.

According to the present invention, there are provided the new benzene derivatives of the general formula:-

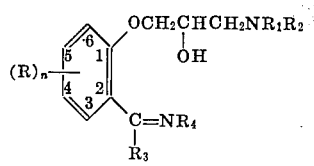

wherein R represents a halogen atom or a nitro, amino, monoalkylamino, dialkylamino, aryl, e.g. phenyl, alkanoylamino, alkanesulphonamido, alkyl or alkoxy group, $R_1$ represents a hydrogen atom or an alkyl, e.g. a methyl, group which may be substituted by, for example, one or more hydroxy groups, $R_2$ represents an alkenyl, cycloalkyl, aralkyl e.g. phenylalkyl, or alkoxyalkyl group, or an alkyl group which may be substituted, for example by one or more halogen atoms or hydroxy groups, or $R_1$ and $R_2$ together with the nitrogen to which they are attached represent morpholino, $R_3$ represents a hydrogen atom or an alkyl, alkenyl or alkoxyalkyl group or an aryl, e.g. phenyl, group which may be substituted, for example by one or more halogen atoms, or alkyl, alkoxy or cyano groups, or an aralkyl, e.g. phenylalkyl, group the aryl portion of which may be substituted, for example by one or more halogen atoms or alkyl, alkoxy or cyano groups, or a 5- or 6-membered heterocyclyl group joined through a carbon atom of the heterocyclic ring to the carbon atom linked to the benzene ring, e.g. thienyl, pyridyl, pyrimidyl or thiazolyl, $R_4$ represents an alkyl, aryl, e.g. phenyl, or aralkyl, e.g. phenylalkyl, group, a group $OR_5$ (wherein $R_5$ represents a hydrogen atom or an alkyl, aryl, e.g. phenyl, or aralkyl, e.g. phenylalkyl, group), a group $NHR_6$ (wherein $R_6$ represents a hydrogen atom, an alkyl, aryl, e.g. phenyl, or aralkyl, e.g. phenylalkyl, group, or a carboxylic or sulphonic acyl group derived from an aliphatic, araliphatic, e.g. phenylaliphatic, or aryl, e.g. phenyl or naphthyl, carboxylic or sulphonic acid or heterocyclic carboxylic acid or sulphonic acid wherein the heterocyclyl group is 5- of 6-membered, e.g. thienyl, pyridyl, pyrimidyl, isothiazolyl or thiazolyl, and the carbonyl or sulphonyl group is attached to a carbon atom of the heterocyclyl group, the aryl groups within the definition of $R_6$ as a carboxylic or sulphonic acyl group being optionally substituted by one or more halogen atoms or alkyl, trifluoromethyl, aryl, e.g. phenyl, alkoxy, aryloxy, hydroxy, nitro, amino, monoalkylamino, dialkylamino, alkanoylamino, alkanesulphonamido, sulphamoyl, monoalkylsulphamoyl, dialkylsulphamoyl, cyano, carboxy or alkoxycarbonyl groups), or a group $—NHC(=Z)NR_7H$ (wherein Z represents an oxygen or sulphur atom or a group NH and $R_7$ represents a hydrogen atom or an alkyl, hydroxyalkyl, alkoxyalkyl, aryl, e.g. phenyl, aralkyl optionally carrying an alkoxy substituent on the aryl nucleus, e.g. phenylalkyl, group, or a 5- or 6-membered heterocyclyl group joined to the nitrogen atom through a carbon atom of the heterocyclic ring, e.g. thienyl, pyridyl, pyrimidyl or thiazolyl), and $n$ is 0 or an integer from 1 to 4 inclusive, preferably 0, 1 or 2, and their acid addition salts.

In this Specification and the accompanying claims it is to be understood that alkyl, alkenyl, alkanoyl and alkoxy groups within the definitions of the symbols R, $R_1$, $R_2$, $R_3$, $R_4$, $R_5$, $R_6$, and $R_7$, or which form parts of groups within the definitions of these symbols, and the alkane portion of alkenesulphonamido groups within the definition of the symbol R, contain not more than six carbon atoms and may be straight- or branched-chain, and the cycloalkyl groups within the definition of $R_2$ contain from 3 to 6 carbon atoms. Suitable values for the symbol $R_6$ include carboxylic and sulphonic acyl groups derived from straight- or branched-chain aliphatic carboxylic, sulphonic and thiocarboxylic acids containing not more than six carbon atoms, phenylaliphatic carboxylic, sulphonic and thiocarboxylic acids wherein the aliphatic portion is straight- or branched-chain and contains not more than six carbon atoms, and benzoic and benzene sulphonic acids. When the symbol $n$ represents 2, 3 or 4, the substituent represented by the symbol R may be the same or different.

The compounds of formula I exist in steroisomeric form and the present invention includes all such forms and their acid addition salts.

Preferred compounds according to the present invention are those where $R_1$ represents a hydrogen atom, $R_2$ represents an isopropyl group, $R_3$ represents an alkyl group containing 1 to 6 and, more particularly 1 or 2 carbon atoms, or a phenyl group, and $R_4$ represents an alkylureido, hydroxyalkylureido, alkylthioureido, hydroxyalkylthioureido, alkoxyalkylthioureido, heterocyclylcarbonylamino, arylcarbonylamino, aralkylcarbonylamino or arylsulphonamido group, or more particularly, a hydroxy, ureido or thioureido group, and $n$ is zero.

Individual compounds of particular value are DL-1-(o-acetylphenoxy)-2-hydroxy-3-isopropylaminopropane oxime, DL-2-hydroxy-3-isopropylamino-1-(o-n-propionylphenoxy)propane oxime, DL-1-(o-acetylphenoxy)-2-hydroxy-3-isopropylaminopropane pyridine-4-carboxyhydrazone, DL-1-(o-acetylphenoxy(-2-hydroxy-3-isopropylaminopropane p-sulphamoylbenzoylhydrazone, DL-1-(o-acetylphenoxy)-2-hydroxy-3-isopropylaminopropane α-naphthalenesulphonylhydrazone, DL-1-(o-acetylphenoxy)-2-hydroxy-3-isopropylaminopropane β-naphthalenesulphonylhydrazone, DL-1-(o-acetylphenoxy)-2-hydroxy-3-isopropylaminopropane phenylacetylhydrazone, DL-1-(o-acetylphenoxy)-2-hydroxy-3-isopropylaminopropane p-nitrobenzenesulphonylhydrazone, DL-1-(o-acetylphenoxy)-2-hydroxy-3-isopropylaminopropane 3,4-dihydroxybenzoylhydrazone and DL-1-(o-acetylphenoxy)-2-hydroxy-3-isopropylaminopropane p-methoxybenzenesulphonylhydrazone and, more particularly, DL-1-(o- acetylphenoxy)-2-hydroxy-3-isopropylaminopropane semicarbazone, DL-1-(o-acetylphenoxy)-2-hydroxy-3-isopropylaminopropane p-chlorobenzenesulphonylhydrazone, DL-1-(o-acetylphenoxy)-2-hydroxy-3-(1-methyl-3-phenylpropylamino)propane oxime, DL-1-(o-acetylphenoxy)-2-hydroxy-3-isopropylaminopropane benzenesulphonylhydrazone, and DL-1-(o-acetylphenoxy)-2-hydroxy-3-isopropylaminopropane p-hydroxybenzoylhydrazone.

The new benzene derivatives of formula I and their non-toxic acid addition salts possess pharmacodynamic properties of value in the treatment of prophylaxis of various cardiac disorders manifested by "angina of effort" and cardiac arrhythmias and, administered in conjunction with an α-sympathetic blocking agent, in the relief, prior to surgery, of the symptoms of pheochromocytoma which are due, as is known, to the presence of high amounts of noradrenaline in the bloodstream. In laboratory screening methods, the new compounds correct experimentally induced cardiac arrhythmias in the guinea-pig anaesthetized with urethane intraperitoneally and in the cat anaesthetized with chloralose intraperitoneally, as shown by their effect when administered intravenously in doses between 1 and 20 mg./kg. animal body weight in increasing the intravenous dose of ouabain required to produce cardiac arrest. They increase the refractory period of isolated heart atria to electrical stimulation by the method described by G. S. Dawes, Br.J.Pharmac. Chemother. 1, 90 (1946) in concentrations comparable to the concentrations of quinidine which produce a similar increase in the refractory period. In the anaesthetized cat and dog, they antagonize the positive inotropic and chronotropic effects of isoprenaline and of cardiac β-sympathetic stimulation in doses between 0.1 and 1.0 mg./kg. animal body weight intravenously and between 1.0 and 10 mg./kg. animal body weight orally, as shown by their effect in reducing the tachycardia and fall in diastolic blood pressure produced by the administration in the cat (anaesthetized with pentobarbitone and chloralose intraperitoneally) of 0.3 µg. of isoprenaline administered via the jugular vein to that produced by the similar administration of 0.15 µg. of isoprenaline, when administered intravenously (with the vagal nerves severed) and, when administered orally, by their effect on intravenous administration in reducing the tachycardia induced by electrical stimulation of the accelerans nerve of the cat (anesthetized with pentobarbitone and chloralose intraperitoneally), and by their effect in reducing the tachycardia and fall in diastolic pressure produced by the administration in the dog (anaesthetized with pentobarbitone and chloroalose intraperitoneally) of 0.3 µg. of isoprenaline administered via the jugular vein, to that produced by the similar administration of 0.15 µg. of isoprenaline, when administered intravenously or orally. The compound propranolol, which is used clinically in the treatment or prophylaxis of angina of effort and cardiac arrhythmias and, administered in conjunction with an α-sympathetic blocking agent, in the relief, prior to surgery, of the symptoms of pheochromocytoma gives similar results in these tests.

Besides the compounds specifically mentioned above, those compounds of general formula I wherein either $n$ is zero or $n$ is 1 and R is phenyl in position para to the propoxy side chain, $R_1$ is hydrogen, alkyl of up to 6 carbon atoms, e.g. methyl, ethyl, or n-propyl, or hydroxyalkyl of up to 6 carbon atoms, e.g. 2-hydroxyethyl, $R_2$ is alkyl of up to 6 carbon atoms, e.g. methyl, ethyl, n-propyl, or isopropyl, or hydroxyalkyl of up to 6 carbon atoms, e.g. 2-hydroxyethyl, or $R_1$ and $R_2$ together with the nitrogen to which they are attached represent morpholino, $R_3$ is hydrogen or alkyl of up to 6 carbon atoms, e.g. methyl, and $R_5$ is hydrogen or phenylalkyl of up to 6 carbon atoms in the alkyl residue, e.g. benzyl, and especially those in which $R_1$ and $R_2$ are both methyl, n-propyl or 2-hydroxyethyl, $R_3$ is hydrogen, and $R_5$ is benzyl, have also been found to possess valuable pharmacodynamic properties of the same kind, more specifically the compounds 1-(o-formylphenoxy)-2-hydroxy-3-isopropylaminopropane 0-benzyloxime, 1-(o-formylphenoxy)-2-hydroxy-3-morpholinopropane 0-benzyloxime, 1-(o-acetylphenoxy)-2-hydroxy-3-morpholinopropane 0-benzyloxime, 1-(o-formylphenoxy)-2-hydroxy-3-diethylaminopropane 0-benzyloxime, 1-(o-acetylphenoxy)-2-hydroxy-3-diethylaminopropane oxime, 1-(o-formylphenoxy)-2-hydroxy-3-dimethylaminopropane 0-benzyloxime, 1-(o-formylphenoxy)-2-hydroxy-3-di-n-propylaminopropane 0-benzyloxime, 1-(o-formylphenoxy)-2-hydroxy-3-di(2-hydroxyethyl)aminopropane 0-benzyloxime, and 1-(2-acetyl-4-phenylphenoxy)-2-hydroxy-3-isopropylaminopropane oxime, possess outstanding properties as anti-arrhythmic agents, and somewhat lower activity as β-adrenoceptor blocking agents. This property is particularly marked with the second, fourth, fifth and seventh compound specifically mentioned above, with which an anti-arrhythmic effect may be obtained at doses lower than those required to produce a significant β-adrenoceptor blocking effect.

These properties have been demonstrated in the following laboratory screening methods:

Anti-arrhythmic activity

Test A. Activity against ouabain-induced cardiac arrhythmia in the dog

Dogs were anaesthetised with sodium pentobarbitone (30 mg./kg. intravenously) and ouabin was then administered intravenously in divided doses until a sustained ventricular tachycardia was produced, as shown by the E.C.G. record. The compound under test was then infused intravenously until the normal sinus rhythm was restored. The proportion of test animals in which reversion was produced, the mean of the doses required to produce reversion in the animals in which reversion was produced, and the duration of the reversion in each animal was recorded. This test procedure was first described by Lucchesi et al. [J. Pharmac. Exp. Ther., 132, 372–381 (1961)].

Test B. Activity on the maximum driving frequency of isolated rabbit atria

The test method used was essentially that described by Dawes [Brit. J. Pharmacol. 1, 90 (1946)] but using a square-wave stimulator in place of an induction coil. Isolated rabbit atria were maintained in Tyrode solution and stimulated at increasing frequencies. The response of the atria was recorded and the maximum frequency which the atria could follow was determined. This frequency was defined as the maximum driving frequency. The test compound was added as a solution to the Tyrode solution bathing the atria. The concentration in µg./ml. of the test compound of the Tyrode solution was found which reduced the maximum driving frequency to 75% of that in the absence of the compound.

Test C. Activity on the electrocardiograph of anaesthetised guinea-pigs or dogs

Guinea-pigs were anaesthetised with a mixture of urethane and sodium pentobarbitone. The test compound was administered as a slow intravenous infusion. The P-R interval of the electrocardiograph was recorded until it reached 125% of its initial value. The dose which has been infused up to this time was recorded as the effective dose. In an alternative procedure, the test compound was administered as a slow intravenous injection to dogs anaesthetised with sodium pentobarbitone (36 mg/kg intravenously) until the P-R intervals of the electrocardiograph reached 125% of its initial value. The dose which had been infused upto this time was recorded as the effective dose.

β-Adrenoceptor-blocking activity

Test D. β-Adrenoceptor blocking activity in the cat (intravenous administration)

Cats were anaesthetised with a mixture of sodium pentobarbitone (6-12 mg./kg) and chloralose (80 mg./kg.) administered intraperitoneally. The heart rate was recorded from the E.C.G. or from the pulse and blood pressure from the carotid artery. Whole and half doses of isoprenaline were then administered, intravenously via the jugular vein, alternately at 7 minute intervals. 3 ½ minutes after a half does of isoprenaline, the compound under test was administered intravenously. 3 ½ minutes later the whose dose of isoprenaline was administered. The doses of the test compound required to reduce (1) the tachycardia and (2) the fall in diastolic blood pressure produced by the whole dose of isoprenaline to that produced by the half dose were determined. The former response gives a measure of the ability of the test compound to block β-adrenoceptors in the heart while the latter response gives a measure of the ability of the test compound to block vasodilation.

The compounds propranolol and practolol which are used clinically for the treatment or prophylaxis of cardiac disorders as anti-arrhythmic and β-adrenoceptor-blocking agents, and the compounds lignocaine and quinidine, which are used clinically in the treatment of cardiac arrhythmias give similar results in these tests.

The results obtained in the above tests are set out in the following Table I.

Test Compound I is DL-1-(o-formylphenoxy)-2-hydroxy-3-isopropylaminopropane 0-benzyloxime Test Compound II is DL-1-(o-formylphenoxy)-2-hydroxy-3-morpholinopropane 0-benzyloxime hydrochloride Test Compound III is DL-1-(o-acetylphenoxy)-2-hydroxy-3-morpholinopropane 0-benzyloxime hydrochloride Test Compound IV is DL-1-(o-formylphenoxy)-2-hydroxy-3-diethylaminopropane 0-benzyloxime hydrochloride Test Compound V is DL-1-(o-acetylphenoxy)-2-hydroxy-3-diethylaminopropane oxime Test Compound VI is DL-1-(o-formylphenoxy)-2-hydroxy-3-dimethylaminopropane 0-benzyloxime hydrochloride Test Compound VII is DL-1-(o-formylphenoxy)-2-hydroxy-3-di-n-propylaminopropane 0-benzyloxime hydrochloride Test Compound VIII is DL-1-(o-formylphenoxy)-2-hydroxy-3-di-(2-hydroxyethyl)aminopropane 0-benzyloxime hydrochloride Test Compound IX is DL-1-(2-acetyl-4-phenylphenoxy)-2-hydroxy-3-isopropylaminopropane oxime In addition, it has been found that the compounds of formula I, in which R represents halogen or alkyl of up to 6 carbon atoms, $R_1$ is hydrogen, $R_2$ is isopropyl, $R_3$ is alkyl of up to 6 carbon atoms or phenyl, $R_4$ is hydroxy, alkoxy of up to 6 carbon atoms, benzyloxy, ureido ($-NHCONH_2$) or thioureido ($-NHCSNH_2$) and $n$ is 0, 1, or 2, one of the R substituents being in the 3-position of the benzene ring when $n$ is 2, and $R_3$ being branched chain alkyl or phenyl when there is no substituent in the said 3-position, and their salts, have a valuable vascular β-adrenoceptor blocking effect combined with a relatively low cardiac β-adrenoceptor blocking effect. This combination of properties is indicative of utility in the treatment of migraine, believed to be caused by vasoconstriction in the head, where block of cardiac β-adrenoceptors is not beneficial and may be harmful. These compounds may be represented by the formula:

TABLE I

| Test | ANTI-ARRHYTHMIC ACTIVITY | | | | β-ADRENOCEPTOR-BLOCKING ACTIVITY | |
|---|---|---|---|---|---|---|
| | A | B | | C (G = guinea pig, D = dog) | D | |
| TEST COMPOUND | Proportion reverting | Dose mg./kg. i.v. | Duration mins | Concentration ug./ml. | Dose mg./kg. i.v. | Cardiac mg./kg. i.v. | Vascular mg./kg. i.v. |
| I | 4/5 | 1.7 | 26 | 2.4 | 4.2 (G) | 0.23 | 0.46 |
| II | 3/3 | 1.5 | 18 | 2.3 | 4.9 (G) | >2.0 | >2.0 |
| III | 2/2 | 4.1 | 20 | 2.7 | 18.3 (G) | 1.9 | 1.2 |
| IV | 2/2 | 2.9 | >30 | 4 | 3.7 (G) | >3.0 | >3.0 |
| V | 3/3 | 3.8 | 16 | 9.4 | 12.1 (G) | >5.0 | >5.0 |
| VI | 4/4 | 2.05 | 21 | 1.1 | 9.2 (D) | 2.2 | 0.97 |
| VII | 3/3 | 2.6 | 28 | 1.1 | 6.0 (D) | >3 | >3 |
| VIII | 2/2 | 2.1 | 12 | 1.35 | 10.0 (D) | 1.4 | 0.38 |
| IX | 2/2 | 2.7 | >30 | 2.7 | 16.5 (G) | >0.5 | >0.5 |
| Propranolol | 2/4 | 3.1 | 18 | 1.2 | 7.0 (G) 4.8 (D) | 0.023 | 0.019 |
| Practolol | 0/4 | — | — | 160 | 48 (G) >100 (D) | 0.14 | 2.2 |
| Lignocaine | 3/4 | 0.95 | 2½ | 18 | 7.0 (G) 20 (D) | — | — |
| Quinidine | 3/3 | 3.7 | >30 | 3.1 | 6.0 (G) 16 (D) | — | — |

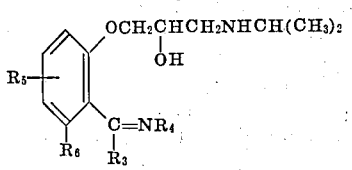

and their non-toxic acid addition salts, in which either $R_6$ is hydrogen and $R_3$ is branched alkyl of 3 to 6 carbon atoms or phenyl or $R_6$ is alkyl of up to 6 carbon atoms or halogen and $R_3$ is alkyl of up to 6 carbon atoms of phenyl, $R_4$ is hydrogen, alkoxy of up to 6 carbon atoms, benzyloxy, $-NHCONH_2$, or $-NHCSNH_2$ and $R_5$ is hydrogen, alkyl of up to 6 carbon atoms or halogen.

Preferred compounds of this class are 2-hydroxy-1-isopropylamino-3-(o-pivaloylphenoxy)propane oxime (Test Compounds X), 1-(o-benzoylphenoxy)-2-hydroxy-3-isopropylaminopropane oxime (Test Compound XI), 1-(2-acetyl-3,5-dimethylphenoxy)-2-hydroxy-3-isopropylaminopropane oxime (Test Compound XII), 1-(2-acetyl-3,5-dimethylphenoxy)-2-hydroxy-3-isopropylaminopropane thiosemicarbazone (Test Compound XIII), and 1-(2-acetyl-3,5-dimethylphenoxy-2-hydroxy-3-isopropylaminopropane semicarbazone (Test Compound XIV), and their non-toxic acid addition salts. The activity of these compounds has been demonstrated in Test D described above and the results given in the following Table II obtained.

TABLE II

| TEST COMPOUND | β-ADRENOCEPTOR BLOCKING ACTIVITY | | Ratio |
|---|---|---|---|
| | Cardiac mg./kg. i.v. | Vascular mg./kg. i.v. | |
| X | 0.65 | 0.013 | 50 |
| XI | 0.44 | 0.013 | 34 |
| XII | 0.72 | 0.020 | 36 |
| XIII | 0.25 | 0.020 | 13 |
| XIV | 1.3 | 0.065 | 20 |

Thus each compound is more than ten times as active in blocking vascular β-adrenoceptors as in blocking cardiac β-adrenoceptors.

In the aforementioned tests, the new compounds did not give rise to any acute side effects. Acute toxicity studies have shown that the $LD_{50}$ value in the mouse of the new compounds are between 25 and 100 mg./kg. animal body weight intravenously and greater than 400 mg./kg. animal body weight orally.

According to a feature of the present invention, the benzene derivatives of formula I are prepared by the reaction of a compound of the general formula:

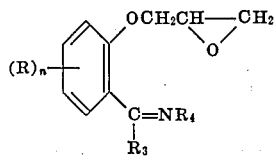

  II (wherein R, $R_3$, $R_4$ and $n$ are as hereinbefore defined) with an amine of the general formula:

$$HNR_1R_2$$

III wherein $R_1$ and $R_2$ are as hereinbefore defined. The reaction may conveniently be carried out in an inert organic solvent, for example dimethylformamide or a lower alkanol e.g. ethanol, at a temperature between 0°C. and 100°C.

The intermediate epoxide of formula II may be obtained (optionally in situ) from a compound of the general formula:

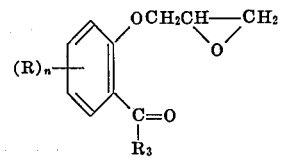

  IV (wherein R, $R_3$ and $n$ are as hereinbefore defined) by reaction with a compound of the general formula:

$$H_2NR_4$$

V wherein $R_4$ is as hereinbefore defined. The reaction may be carried out in an inert organic solvent, for example dimethylformamide, at a temperature between 0°C. and 100°C.

The compounds of general formula IV may be prepared by methods known per se for the preparation of epoxides, e.g. by the reaction of epichlorhydrin with a phenol of the general formula:

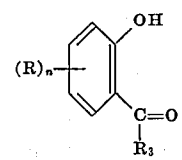  VI wherein R, $R_3$ and $n$ are as hereinbefore defined. The reaction may be carried out in an aqueous or inert organic solvent, for example dimethylformamide or a lower alkanol, e.g. ethanol, in the presence of a basic condensing agent, for example, potassium carbonate, sodium hydroxide or sodium ethoxide, at a temperature between 0°C. and 100°C.

The epoxides of formula II may alternatively be prepared by reaction of epichlorhydrin with a compound of the formula:

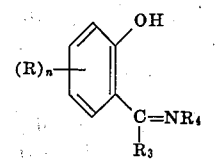  VII (wherein R, $R_3$, $R_4$, and $n$ are as hereinbefore defined) using the same reaction conditions as mentioned above for the reaction of epichlorhydrin with the phenols of formula VI.

Compounds of formula VII may be prepared by the reaction of compounds of formula VI with compounds of formula V. The reaction may be carried out in an inert organic solvent, for example dimethylformamide or a lower alkanol, e.g. ethanol, at a temperature between 0°C. and 100°C.

According to a further feature of the present invention, the benzene derivatives of formula I are prepared by the reaction of a compound of the formula:

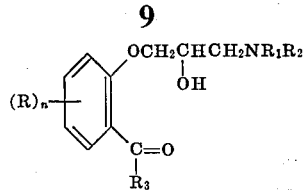

VIII (wherein R, R₁, r₂, r₃ and n are as hereinbeofre defined) with a compound of formula V. The reaction may be carried out in an aqueous or inert organic solvent, for example dimethylformamide or a lower alkanol, e.g. ethanol, at a temperature between 0°C. and 100°C.

Compounds of formula VIII are conveniently obtained from epoxides of formula IV by reaction with an amine of formula III. The reaction may conveniently be effected in an inert organic solvent, for example dimethylformamide or a lower alkanol, e.g. ethanol at a temperature between 0°C. and 100°C.

According to another feature of the invention, the benzene derivatives of formulla I are prepared by reaction of a compound of the formula:

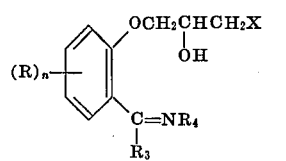

IX (wherein R, R₃, R₄ and n are as hereinbefore defined, and X represents the acid residue of a reactive ester, for example a halogen atom or a toluene-p-sulphonate group) with an amine of formula III.

The intermediates of formula IX may be obtained by the reaction of a compound of the formula:

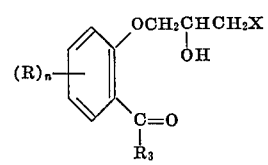

X (wherein R, R₃, X and n are as hereinbefore defined) with a compound of formula V. The reaction may be effected in an aqueous or inert organic solvent, for example dimethylformamide or a lower alkanol, e.g. ethanol, at a temperature between 0°C. and 100°C.

According to yet a further feature of the present invention compounds of formula I having one or more substituents as hereinbefore defined on the benzene ring may be converted by methods known per se into other compounds of formula I with different substituents on the benzene ring, for example, compounds of formula I wherein the benzene ring is substituted by one or more nitro groups may be converted into the corresponding primary amino-substituted compounds by reduction. Reduction may be effected by, for example, hydrogenation in the presence of a hydrogenation catalyst such as, for example, platinum oxide, in a suitable medium, e.g. aqueous methanol.

In the preparation of compounds of general formula I in which the benzene ring is substituted as hereinbefore defined (i.e. n is an integer from 1 to 4) it is necessary, as will be readily apparent to those skilled in the art, to select processes from those described above which are appropriate to the substituent or substituents present. Thus, for example, when it is desired to prepare a compound containing a primary amino group, processes involving the use of reactants containing the groups CHOHCH₂X (wherein X is as hereinbefore defined) and

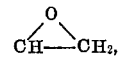

which are likely to react with the primary amino group to give undesired by-products, will be avoided.

The benzene derivatives of general formula I may be converted by methods known per se into acid addition salts. Thus the acid addition salts may be obtained by the action of an acid on the benzene derivatives in an appropriate solvent such as diethyl ether. The acid addition salt which is formed is precipitated, if necessary after concentration of its solution, and is separated by filtration or decantation.

For use in medicine, the benzene derivatives of general formula I are employed as such or in the form of non-toxic addition salts, i.e. salts containing anions which are relatively innocuous to the animal organism when used in pharmacodynamically effective doses so that the beneficial properties inherent in the bases are not vitiated by side-effects ascribable to the anions. Suitable non-toxic salts include salts derived from inorganic acids, for example hydrochlorides, hydrobromides, phosphates, sulphates and nitrates, and organic acids, for example oxalates, lactates, tartrates, acetates, salicylates, citrates, propionates succinates, fumarates, maleates, methylene-bis-β-hydroxynaphthoates, gentisates and D-di-p-toluoyl tartrates.

By the term "methods known per se, " as used in the present specification, is meant methods heretofore used or described in the chemical literature. The following Examples illustrate the preparation of new compounds of the invention.

EXAMPLE 1

1-(o-Acetylphenoxy)-2,3-epoxypropane (23.6 g.) hydroxylamine hydrochloride (8.4 g.), and anhydrous sodium acetate (9.85 g.) in dry dimethylformamide (100 ml.) were stirred for 18 hours at room temperature. Isopropylamine (50 g.) and ethanol (50 ml.) were added to the resulting reaction mixture containing 1(o-acetylphenoxy)-2,3-epoxypropane oxime, the mixture was refluxed for 3 hours, then concentrated under reduced pressure, and the residue was treated with water (250 ml.) and the pH adjusted to 10. The mixture was extracted with chloroform and the dried extract was concentrated to an oil which was treated with ethyl acetate and diethyl ether to give DL-1-(o-acetylphenoxy)-2-hydroxy-3-isopropylaminopropane oxime (15 g.), m.p. 94°c.

The 1(o-acetylphenoxy)-2,3-epoxypropane was prepared by the method of Beasley, Petrow and Stephenson J. Pharm. Pharmac. 1958, 10, 47.

EXAMPLE 2

DL-1-(o-Acetylphenoxy)-2-hydroxy-3-isopropylaminopropane (12.6 g.) was added to a solution of hydroxylamine hydrochloride (7.0 g.) and sodium acetate (8.2 g.) in water (200 ml.) at 60° ±5°C., and the reaction mixture was stirred at that temperature for 4 hours, then cooled and brought to pH 9 with 2N sodium hydroxide solution, and extracted with ethyl acetate. The extract was dried, concentrated and treated with diethyl ether to give DL-1-(o-acetylphenoxy)-2-hydroxy-3-isopropylaminopropane oxime (12.1 g.), m.p. 94°C., undepressed by a sample prepared as in Example 1.

The starting material was prepared as follows:-

1-(o-Acetylphenoxy)-2,3-epoxypropane (15 g.), isopropylamine (15 g.) and ethanol (25 ml.) were refluxed for 3 hours. The reaction mixture was then concentrated under reduced pressure and the residual oil treated with 2N hydrochloric acid and ethyl acetate. The acid extract was brought to pH 11 with 50% sodium hydroxide solution to give DL-1-(o-acetylphenoxy)-2-hydroxy-3-isopropylaminopropane (11.0 g.), m.p. 104°–106°C.

Proceeding in a similar manner, the following compounds were prepared. The mono or dihydrochlorides were prepared by treatment of the oxime with hydrogen chloride in diethyl ether. The aminoketone derivatives used as starting materials were prepared according to epoxides. procedure given below from the corresponding opoxides.

1. DL-2-Hydroxy-1-isopropylamino-3-(o-propionylphenoxy)propane oxime, m.p. 68°–69°C.
2. (o-n-Butrylphenoxy)-2-hydroxy-3-isopropylaminopropane oxime, m.p. 68°–70°C.
3. DL-2-HYdroxy-1-isopropylamino-3-(o-valeryphenoxy)propane oxime hydrochloride, m.p. 137°–138°C.
4. DL-2-Hydroxy-1-(o-isobutyrylphenoxy)-3-isopropylaminopropane oxime, m.p. 64°–66°C.
5. DL-2-Hydroxy-1-isopropylamino-3-(o-pivaloylphenoxy)propane oxime hydrochloride, m.p. 203°–204°C.
6. DL-1-(o-Heptanoylphenoxy)-2-hydroxy-3-isopropylaminopropane oxime hydrochloride, m.p. 107°–108°C.
7. DL-2-Hydroxy-1-(o-isohexanoylphenoxy)-3-isopropylaminopropane oxime dihydrochloride, m.p. 119°–124°C.
8. DL-2-Hydroxy-1-isopropylamino-3-(o-phenylacetylphenoxy)propane oxime, m.p. 170°–172°C.
9. DL-2-Hydroxy-1-isopropylamino-3-[o-(β-phenylpropionyl)phenoxy]-propane oxime hydrochloide, m.p. 150°C.
10. DL-2-Hydroxy-1-isopropylamino-3-[o-(4-pyridinecarbonyl)phenoxyl]-propane oxime, m.p. 120°–124°c.
11. DL-1-(2-Acetyl-4-methylphenoxy)-2-hydroxy-3-isopropylaminopropane oxime, m.p. 97°–99°C.
12. DL-1-(2-Acetyl-4-methoxyphenoxy)-2-hydroxy-3-isopropylaminopropane oxime, m.p. 134°–136°c.
13. DL-1-(2-Acetyl-4-chlorophenoxy)-2-hydroxy-3-isopropylaminopropane oxime, m.p. 104°–110°C.
14. DL-1(4-Acetamido-2-acetylphenoxy)-2-hydroxy-3-isopropylaminopropane oxime, m.p. 126°–129°C.
15. DL-1-(2-Acetyl-5-phenylphenoxy)-2-hydroxy-3-isopropylaminopropane oxime, m.p. 144°–146°C.
16. DL-1-(2-Acetyl-3,5-dimethylphenoxy)-2-hydroxy-3-isopropylaminopropane oxime, m.p. 106°–110°C.
17. DL-1-(2-Acetyl-4,5-dimethylphenoxy)-2-hydroxy)-2-hydroxy-3-isopropylaminopropane oxime, m.p. 127°–129°C.
18. DL-1-(o-Acetylphenoxy)-3-t-butylamino-2-hydroxypropane oxime dihydrochloride, m.p. 146°–148°C.
19. DL-1-(o-Acetylphenoxy)-3-(2-ethoxyethylamino)-2-hydroxypropane oxime, m.p. 79°–83°C.
20. DL-1-(o-Acetylphenoxy)-2-hydroxy-3-isopropylaminopropane O-methyloxime hydrochloride, m.p. 142°–144°C.
21. DL-1-(2-Acetyl-4-nitrophenoxy)-2-hydroxy-3-isopropylaminopropane oxime, m.p. 155°–158°C.
22. DL-1-(2-Acetyl-5-chlorophenoxy)-2-hydroxy-3-isopropylamino- propane oxime, m.p. 119°–122°C.
23. DL-1-(2-Acetyl-4-phenylphenoxy)-2-hydroxy-3-isopropylaminopropane oxime, m.p. 112°–115°C.
24. DL-1-(21Acetyl-4,5-dichlorophenoxy)-2-hydroxy-3-isopropylaminopropane oxime, m.p. 140°142°C.
25. DL-1-(o-Acetylphenoxy)-2-hydroxy-3-(1-methyl-3-phenylpropylamino) propane oxime hydrochloride, m.p. 139°C.
26. DL-1-(o-Acetylphenoxy)-2-hydroxy-3-isopropylaminopropane O-benzyloxime hydrochloride, m.p. 113°–114°C.

The epoxide intermediates of the formula specified hereafter were prepaed as follows:

Method A. A mixture of the phenol, an excess of epichlorhydrin, potassium carbonate and dimethylformamide were heated together in an atmosphere of nitrogen on the steam-bath. The period of heating was determined by following the course of the reaction by thin-layer chromatography. The reaction mixture was pured into water, extracted with diethyl ether, and the extract dried and evaporated, and the residue distilled in vacuo and / or recrystallised from an suitable solvent.

Method B. The phenol was treated with a solution of sodium ethoxide in ethanol, and the precipitated sodium salt of the phenol was filtered off and added in portions (sometimes by means of a Soxhlet extractor) to a refluxing solution of an excess of epichlorhydrin in ethanol. The mixture was refluxed for a further period (determined by following the course of the reaction by thin-layer chromatography) and worked up as in Method A.

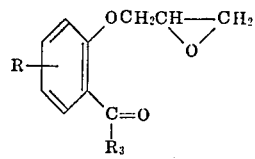

| Intermediate for Compound No. | R | $R_3$ | Method of preparation | M.P., degrees | B.P. |
|---|---|---|---|---|---|
| 1 | H | $C_2H_5$ | A | | 147–148°/0.5mm. |
| 2 | H | n-$C_3H_7$ | A | | 126–130°/0.1mm. |
| 3 | H | n-$C_4H_9$ | A | | 135–150°/0.05mm. |

—Continued

| Intermediate for Compound No. | R | $R_5$ | Method of preparation | M.P., degrees | B.P. |
|---|---|---|---|---|---|
| 4 | H | Iso-$C_3H_7$ | B | | 125°/0.1mm. |
| 5 | H | Tert-$C_4H_9$ | A | | 128–132°/0.2mm. |
| 6 | H | n-$C_6H_{13}$ | A | | 140–155°/0.3mm. |
| 7 | H | Iso-$C_5H_{11}$ | A | | 130–140°/0.2mm. |
| 8 | H | $PhCH_2$ | B | | 190–220°/0.5mm. |
| 9 | H | $PhCH_2CH_2$ | A | | ca 200°/0.25mm. |
| 10 | H | (pyridyl structure) | A | | Oil (not distilled). |
| 11 | 4-$CH_3$ | $CH_3$ | A | | 120–190°/0.4mm. |
| 12 | 4-$CH_3O$ | $CH_3$ | A | 79–81 | 140–180°/0.5mm. |
| 13 | 4-Cl | $CH_3$ | A | 75–76 | |
| 14 | 4-$CH_3CONH$ | $CH_3$ | B | 105–112 | |
| 15 | 5-Ph | $CH_3$ | A | 84–85 | |
| 16 | 3,5-Di$CH_3$ | $CH_3$ | B | 63–65 | 117–152°/0.4mm. |
| 17 | 4,5-Di$CH_3$ | $CH_3$ | A | 48–50 | |
| 21 | 4-$NO_2$ | $CH_3$ | B | | Oil (not distilled). |
| 22 | 5-Cl | $CH_3$ | B | 62–66 | 145–160°/0.15mm. |
| 23 | 4-Ph | $CH_3$ | B | | 212–224°/0.1mm. |
| 24 | 4,5-DiCl | $CH_3$ | B | | 180–185°/1.2mm. |

NOTE.—Wherein Ph stands for phenyl.

The intermediate o-hydroxypivalophenone for Compound (5) was prepared as follows:

o-Methoxypivalophenone (9g.) was dissolved in dry pyridine (30 ml.) and dry hydrogen chloride was passed over the surface of the solution until the white fumes had disappeared. The mixture was stirred and refluxed for 15 minutes, left at room temperature overnight, diluted with water and extracted with diethyl ether. The extract was dried, treated with charcoal and evaported. The residue was distilled in vacuo to give o-hydroxypivalophenone, b.p. 125°–135°C./20 mm.

The intermediate o-methoxypivalophenone was prepared as follows:

A solution of o-bromoanisole (70 g.) in diethyl ether (150 ml.) was added slowly to a stirred mixture of magnesium turnings (11.35 g.) and dry diethyl ether (150 ml.) at such a rate as to maintain gentle reflux, (preliminary warming of the reaction mixture and addtion of a trace of methylmagnesium iodide was necessary to inititate the reaction). The solution so obtained was added during 5 hours with stirring and cooling to a solution of pivaloyl chloride (30.15 g.) in dry diethyl ether (100 ml.) in a atmosphere of nitrogen, the reaction mixture being kept between -10° and +15°C. Dilute hydrochloric acid was added to hydrolys, the magnesium complex, and the ether layer was washed twice with aqueous sodium hydorgen carbonate, dried and evaporated. The residue was distilled in vacuo to give o-methoxypivalophenone, b.p. 224°–228°C/9 mm. The intermediate 1-(omethoxybenzoyl)-3-methylbutane for Compound (7) was prepared as follows:

1(o-Methoxybenzoyl)-3-methlbutane was treated with pyridine and hydrogen chloride as described above for o-methoxypivalophenone. The product was distilled in vacuo to give 1-(o-hydroxybenzeyl)-3-methylbutane, b.p. 115°–120°C/0.5 mm.

The intermediate 1-(o-methoxybenzoyl)-3-methylbutane was obtained as follows:

A mixture of 1-hydroxy-1(o-methoxyphenyl)-4-methylpentane (64 g.), sodium dichromate (40.5 g.), glacial acetic acid (300 ml.) and water (100 ml.) was refluxed 1 hour, and poured into water (1500 ml.). The mixture was extracted with diethyl ether, and the extract was washed with aqueous sodium hydorgen carbonate, dried and evaporated, and the residue distilled in vacuo to give 1-(o-methoxybenzoyl)-3-methylbutane, b.p. 105°–110°C/0.25 mm.

The intermediate 1-hydroxy-1-(o-methexyphenyl)-4-methylpentane was obtained as follows:

A solution of isoamylmagnesium bromide in diethyl ether was prepared in the usual way from isoamyl bromide (105.7 g.), magnesium turnings (14.5 g.) and dry diethyl ether (1 litre). The solution was added during 30 minutes with stirring to o-methoxybenzaldehyde (68 g.), and the mixture was refluxed for a further 2 hours. The mixture was cooled, and poured into ice-water containing concentrated hydrochloric acid (120 ml.).The layers were separated and the aqueous solution was extracted twice with diethyl ether. The combined ether solutions were dried and evaporated, and the residue was distilled in vacuo to give 1-hydroxy-1-)o-methoxyphenyl)-4-methylpentane, b.p. 112°–120°C/0.5 mm.

The intermediate 4(o-hydroxybenzoyl)pyridine for Compound (10)was prepared as follows:

4-(o-Methoxybenzoyl)pyridine was treated with pyridine and dry hydrogen chloride as described above (in the prepartion of o-hydroxypivalophenone). The reaction mixture was refluxed for 1 hour, cooled, poured into ice-water, brought to pH 9 by the addtion of concentrated aqueous ammonia, and extracted with diethyl ether. The extract was washed several times with water to remove pyridine, and itself extracted with aqueous sodium hydroxide. The aqueous-layer was neutralised with hydrochloric acid and extracted three times with chloroform. The combined chloroform solution were washed with water, dried and evaporated. The residue was triturated with light petroleum to give 4-(o-hydrobenzoyl)pyridine, m.p. 76°–77°C.

The intermediate 4-(o-methoxybenzoyl)pyridine was prepared in the usual manner from o-bromoanisole (45 g.), magnesium turnings (5.8 g.) and dry diethyl ether (400 ml.). A solution of 4-cyanopyridine (20 g.) in dry diethyl ether (200 ml.) was added during 1 hour with stirring, and the mixture was refluxed for a further 1 hour. Water was then added dropwise with cooling and stirring, followed by sufficient saturated ammonium chloride solution to dissolve the solid. The layers were separated, and the ether layer was extracted three times with dilute sulphuric acid. The combined acid extracts were made alkaline with dilute ammonia, and the' mixture was extracted with diethyl ether. The extract was washed with water, dried and evaporated. The residue was distilled in vacuo to give 4 -(o-methoxybenzoyl) pyridine, b.p. 140°–150°C/0.1 mm.

The intermediate 4,5-dichloro-2-hydroxyacetophenone for Compound (24) was prepared as follows:-

Acetyl chloride (30.8 g.; 28 ml.) was added dropwise with stirring to 3,4-dichlorophenol (64 g.) and stirring was continued for a further 1 hour. The mixture was heated on the steam-bath and stirred for a further 30 minutes. The resulting crude 3,4-dichlorophenyl acetate was added dropwise with stirring to aluminum chloride (78 g.) and the mixture was heated and stirred at 170°C. for 5 hours, cooled, treated with 1: 1 aqueous hydrochloric acid (160 ml.) and then diluted with water (400 ml.). The solid was filtered off and recrystallised from ethanol to give 4,5-dichloro-2-hydroxyacetophenone, m.p. 105°–106°C.

The aminoketone intermediates of the formula specified hereafter were prepared as follows:-

Method A. The epoxide was refluxed in ethanol with an excess of the amine, the period of reflux being determined by following the course of the reaction by thin-layer chromatography. The solvent and excess of amine were evaporated in vacuo and water was added to the residue.

The mixture was extracted with chloroform or diethyl ether, and the extract was itself extracted with dilute mineral acid, and this aqueous solution was made alkaline and re-extracted with chloroform or diethylather. The extract was dried and evaporated and to residue recrystallised from, or triturated with, a suitable solvent. In some cases, the hydrochloride was prepared by the action of dry hydrogen chloride in a suitable solvent.

Method B. As Method A, except that the reaction was carried out at room temperature.

Method C. The epoxide and amine were heated together in an atomsphere of nitrogen at 120°C.

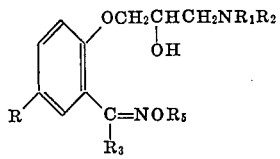

| Intermediate for Compound No. | R | $R_1$ | $R_2$ | $R_3$ | Method of preparation | M.P., degrees Base | Hydrochloride |
|---|---|---|---|---|---|---|---|
| 1 | H | H | $CH(CH_3)_2$ | $C_2H_5$ | A | 87–89 | |
| 2 | H | H | $CH(CH_3)_2$ | $n-C_3H_7$ | A | 103–105 | |
| 3 | H | H | $CH(CH_3)_2$ | $n-C_4H_9$ | A | 82–84 | |
| 4 | H | H | $CH(CH_3)_2$ | $CH(CH_3)_2$ | A | 100 | |
| 5 | H | H | $CH(CH_3)_2$ | $C(CH_3)_3$ | A | Oil | |
| 6 | H | H | $CH(CH_3)_2$ | $n-C_6H_{13}$ | A | 74–77 | |
| 7 | H | H | $CH(CH_3)_2$ | $Iso-C_5H_{11}$ | A | (¹) | |
| 8 | H | H | $CH(CH_3)_2$ | $PhCH_2$ | B | 70–71 | |
| 9 | H | H | $CH(CH_3)_2$ | $PhCH_2CH_2$ | A | 68–70 | |
| 10 | H | H | $CH(CH_3)_2$ | (pyridyl) | A | 80–85 | |
| 11 | $4-CH_3$ | H | $CH(CH_3)_2$ | $CH_3$ | A | 82–84 | |
| 12 | $4-CH_3O$ | H | $CH(CH_3)_2$ | $CH_3$ | A | 83–85 | |
| 13 | 4-Cl | H | $CH(CH_3)_2$ | $CH_3$ | A | 74–75 | 149–151 |
| 14 | $4-CH_3CONH$ | H | $CH(CH_3)_2$ | $CH_3$ | A | 131–134 | |
| 15 | 5-Ph | H | $CH(CH_3)_2$ | $CH_3$ | A | 97–98 | |
| 16 | $3,5-DiCH_3$ | H | $CH(CH_3)_2$ | $CH_3$ | A | 81–84 | |
| 17 | $4,5-DiCH_3$ | H | $CH(CH_3)_2$ | $CH_3$ | A | 82–85 | |
| 19 | H | H | $CH_2CH_2OC_2H_5$ | $CH_3$ | B | 64–66 | |
| 21 | $4-NO_2$ | H | $CH(CH_3)_2$ | $CH_3$ | A | | 171–174 |
| 22 | 5-Cl | H | $CH(CH_3)_2$ | $CH_3$ | A | 77–80 | |
| 23 | 4-Ph | H | $CH(CH_3)_2$ | $CH_3$ | A | | 165–168 |
| 24 | 4,5-DiCl | H | $CH(CH_3)_2$ | $CH_3$ | A | | (²) |
| 25 | H | H | $PhCH_2CH_2\overset{CH_3}{\underset{|}{CH}}-$ | $CH_3$ | C | 78–80 | |

¹ Oily solid.  ² Hygroscopic.
NOTE.—Wherein Ph stands for phenyl.

EXAMPLE 3

DL-1-(o-Acetylphenoxy)-2-hydroxy-3-isopropylaminopropane (10 g.) (prepared as described in Example 2) in methanol (25 ml.) was mixed with a solution of thiosemicarbazide (4 g.) in water (25 ml.) and allowed to stand for 18 hours to give DL-1-(o-acetylphenoxy)-2-hydroxy-3-isopropylaminopropane thiosemicarbazone hydrate (1.1 g.), m.p. 166°–168°C.

Proceeding in a similar manner, the folliwng compounds were prepared:

1. DL-1-(o-Acetylphenoxy)-2-hydroxy-3-isopropylaminopropane 4-o-methoxybenzyl thiosemicarbazone, m.p. 93°–97°C.
2. DL-1-(2-Acetyl-4-chlorophenoxy)-2-hydroxy-3-isopropylaminopropane thiosemicarbazone, m.p.

100°–102°c. The starting amine material was prepared from 1-(2-acetyl-4-chlorophenoxy)-2,3-epoxypropane prepared in situ from 3-chloro-6-hydroxyacetophenone, as described in Example 2.

DL-1-(2-Acetyl-3,5-dimethylphenoxy)-2-hydroxy-3-isopropylaminopropane thiosemicarbazone, m.p. 130°–132°C. The amine starting material was prepared from 1(2-acetyl-3,5-diemthylphenoxy)-2,3-epoxypropane prepared in situ from 2,4-dimethyl-6-hydroxyacetophenone, as described in Example 2.

The intermediate 4-(o-methoxybenzyl) thiosemicarbazide for Compound (1) was prepared as follows:-

Carbon bisulphide (28.4 g., 22.5 ml.) was added dropwise with stirring and cooling to a solution of o-methoxybenzylamine (41.1 g.) in concenrated aqueous ammonia (60 ml.), keeping the temperature of the mixture at 30°–40°C. Ethanol (30 ml.) was added and the mixture was warmed gently until a clear solution was obtained. The solution was stirred for a further 15 minutes, a solution of chloroacetate (35 g.) in water (60 ml) was added, followed by the addition of 100% hydrazine hydrate (15 g.) and the mixture kept at room temperature overnight. The precipitated solid was filtered off, washed with water and recrystallised from ethanol to give 4-(o-methoxybenzyl) thiosemicarbazide m.p.. 129°C.

EXAMPLE 4

DL-1-(o-Acetylphenoxy)-2-hydroxy-3-isopropylaminopropane (10 g.) in methanol (25 ml.) was mixed with a solution of semicarbazide hydrochloride (4.5 g.) and sodium acetate (6.75 g.) in water (25 ml.) and allowed to stand for 18 hours. The reaction mixture was brought to pH 11 with 50% sodium hydroxide solution, extracted with chloroform and dried. The dried extract was concentrated under reduced pressure to an oil which was treated with ethereal hydrogen chloride to give DL-1-(o-acetylphenoxy)-2-hydroxy-3-isopropylaminopropane semicarbazone dihydrochloride (7 g.), m.p. 159°–162°C.

Proceeding in a similar manner, the following compounds were prepared:-
1. DL-1-(2--Acetyl-4-chlorophenoxy)-2-hydroxy-3-isopropylaminopropane semicarbazone, m.p. 134°–135°C. The amine starting material was prepared from 1-(2-acetyl-4-chlorophenoxy)-2,3-epoxypropane prepared in situ from 3-chloro-6-hydroxyacetophenone, as described in Example 2.

2. DL-1-(2-Acetyl-3,5-dimethylphenoxy)-2-hydroxy-3-isopropylaminopropane semicarbazone, m.p. 121°–124°C. The amine starting material was prepared from 1-(2-acetyl-3,5 dimethylphenoxy)-2,3-epoxypropane prepared in situ from 2,4-dimethyl-6-hydroxyacetophenone, as described in Example 2.

3. DL-1-(2-Acetyl-4,5-dimethylphenoxy)-2-hydroxy-3-isopropylaminopropane semicarbazone, m.p. 135°–137°C. The amine starting material was prepared from 1-(2-acetyl-4,5-dimethylphenoxy)-2,3-epoxypropane prepared in situ from 3,4-dimethyl-6-hydroxyacetophenone, as described in Example 2.

4. DL-1-(o-Acetylphenoxy)-2-hydroxy-3-isopropylaminopropane 4-phenylsemicarbazone dihydrochloride, m.p. 98°–102°50 C.

5. DL-1-(2-Acetyl-4-methoxyphenoxy)-2-hydroxy-3-isopropyl aminopropane semicarbazone, m.p. 128°–131°C. The intermediate amine was prepared as described in Example 2.

EXAMPLE 5

DL-1(o-Acetylphenoxy)-2-hydroxy-3-isopropylaminopropane (10 g.) in methanol (10 ml.) and 2N acetic acid (10 ml.) was mixed with 4-ethoxyethyl(thiosemicarbazide) (6.45 g.) in 2N acetic acid (25 ml.) and allowed to stand for b 30 minutes. The reaction mixture was then brought to pH 11 with 50% sodium hydroxide solution, extracted with chloroform and dried. The dried extract was concentrated under reduced pressure to an oil which was treated with ethereal hydrogen chloride to give DL-1-(o-acetylphenoxy)-2-hydroxy-3-isopropylaminopropane 4-ethoxyethyl(thiosemicarbazone)dihydrochloride (8.4 g.), m.p. 125°–128°C.

The intermediate 4-ethoxyethyl (thiosemicarbazide), m.p. 104°–106°C., was prepared by a method analogous to the preparation of 4-(o-methoxybenzyl) thiosemicarbazide, described in Example 3.

Proceeding in a similar manner the follwing thiosemicarbazones were prepared:
1. DL-1-(o-Acetylphenoxy)-2-hydroxy-3-isoproylaminopropane 4-sec-butyl(thiosemicarbazone)-dihydrochloride, m.p. 75°–80°C.
2. DL-1-(o-Acetylphenoxy)-2-hydroxy-3-isopropylaminopropane 4-isobutyl(thiosemicarbazone)dihydrochloride, m.p. 151°–154°C.
3. DL-1-(o-Acetylphenoxy)-2-hydroxy-3-isopropylaminopropane 4-tert-butyl(thiosemicarbazone)dihydrochloride, m.p. 152°–156°C.
4. DL-1-(o-Acetylphenoxy)-2-hydroxy-3-isopropylaminopropane 4-o-chlorophenyl (thiosemicarbazone)dihydrochloride, m.p. 125°C.

EXAMPLE 6

DL-1(o-Acetylphenoxy)-2-hydroxy-3-isopropylaminopropane (10 g.) in methanol (25 ml.) was mixed with a solution of 4-benzyl-(thiosemicarbazide) (4 g.) in 50% aqueous methanol (50 ml.) and allowed to stand for 18 hours. The solid precipitate was collected and dried to give DL-1-(o-acetylphenoxy)-2-hydroxy-3-isopropylaminopropane 4-benzyl(thiosemicarbazone) (4 g.), m.p. 99°–100°C.

EXAMPLE 7

DL-1-(o-Acetylphenoxy)-2-hydroxy-3-isopropylaminopropane (8.7 g.) in methanol (15 ml.)

and pyridine-4-carboxyhydrazide (4.6 g.) in methanol (10 ml.) were mixed and heated to 60°C. for 30 minutes. The reaction mixture was poured into N sodium hydroxide and continuously extracted with ethyl acetate. The extract was concentrated under reduced pressure, and the residual oil was treated with ethereal hydrogen chloride to give DL-1-(o-acetylphenoxy)-2-hydroxy3-isopropyl-aminopropane pyridine-4-carboxyhydrazone trihydrochloride (3.8 g.), m.p. 148°–150°C.

EXAMPLE 8

DL-1-(o-Acetylphenoxy)-2-hydroxy-3-isopropylaminopropane (6.3 g.), 4-(2-pyridyl)semicarbazide (4 g.), concentrated hydrochloric acid (10 ml.) and methanol (75 ml.) were refluxed for 3 hours. The reaction mixture was cooled and then poured into N sodium hydroxide and extracted with chloroform. The extract was concentrated under reduced pressure and the residual oil was treated with benzene to give DL-1-(o-acetylphenoxy)-2-hydroxy-3-isopropylaminopropane 4-(2-pyridyl)semicarbazone hydrate (4.5 g.), m.p. 135°–136°C.

EXAMPLE 9

DL-1-(o-Benzoylphenoxy)-2-hydroxy-3-isopropylaminopropane (9.5 g.) in methanol (25 ml.) was added to hydroxylamine hydrochloride (5.3 g.) and sodium acetate (6.5 g.) in water (100 ml.) and heated to 60°C. for 4 hours. The reaction mixture was poured onto ice and extracted with diethyl ether. The ether extract was concentrated and the residue was treated with petroleum ether (b.p. 40°–60°C.) to give DL-1-(o-benzoylphenoxy)-2-hydroxy-3-isopropylaminopropane oxime (2 g.) m.p. 122°–125°C.

The intermediate amine was prepared as follows:

2-(2,3-Epoxypropoxy)benzophenone (40.8 g.) was refluxed for 3 hours with an excess of isopropylamine, the course of the reaction being followed by thin-layer chromatography. The excess of isopropylamine was removed in vacuo and the residue was dissolved in dilute hydrochloric acid. The solution was shaken three times with diethyl ether, and the aqueous layer was made alkaline and extracted with diethyl ether, and the extract dried and evaporated to give DL-1-(o-benzoylphenoxy)-2-hydroxy-3-isopropylaminopropane.

The intermediate epoxy-compound was obtained as follows:

A mixture of 2-hydroxybenzophenone (62.7 g.), epichlorhydrin (58 g., 49 ml.), anhydrous potassium carbonate (48 g.) and dimethylformamide (100 ml.) was heated on the steam-bath with stirring for 2.5 hours and poured into water. The mixture was extracted three times with diethyl ether, and the extract was dried and evaporated. The residue was distilled in vacuo to give 2-(2,3-epoxypropoxy)benzophenone, b.p. 160°–180°C/0.05 mm.

EXAMPLE 10

DL-1-(o-Acetylphenoxy)-2-hydroxy-3-isopropylaminopropane (7 g.) in methanol (25 ml.) and 4-methyl(thiosemicarbazide) (3 g.) in water (50 ml.) were mixed and heated at 100°C. for 30 minutes. The reaction mixture was cooled and poured into N sodium hydroxide and extracted with chloroform. The chloroform extract was concentrated and the residue was treated with ethereal hydrogen chloride to give D-L-1(o-acetylphenoxy)-2-hydroxy-3-isopropylaminopropane 4-methyl(thiosemicarbazone) dihydrochloride (9.5 g.), m.p. 76°C.

EXAMPLE 11

DL-1-(o-Acetylphenoxy)-2-hydroxy-3-isopropylaminopropane (7 g.), hydrazine hydrate (25 ml.) and ethanol (25 ml.) were refluxed for 18 hours. The reaction mixture was concentrated under reduced pressure, and the residue was treated with diethyl ether to give DL-1-(o-acetylphenoxy)-2-hydroxy-3-isopropylaminopropane hydrazone (4 g.), m.p. 96°–98°C.

EXAMPLE 12

A mixture of DL-1-(o-acetylphenoxy)-2-hydroxy-3-isopropylaminopropane hydrochloride (7.2 g.), benzenesulphonylhydrazide (4.3 g.) and anhydrous methanol (50 ml.) was refluxed until thin-layer chromatography showed that the reaction was complete. The reaction solution was concentrated under reduced pressure and the residue treated wtih diethyl ether to give DL-1-(o-acetylphenoxy)-2-hydroxy-3-isopropylaminopropane benzenesulphonylhydrazone hydrochloride (5.5 g.), m.p. 70°–75°C.

The amine starting material was prepared as follows:
A mixture of 1-(o-acetylphenoxy)-2,3-epoxypropane (15 g.), isopropylamine (15 g.) and ethanol (25 ml.) was refluxed for 3hours. The reaction mixture was concentrated under reduced pressure and the residual oil treated with hydrogen chloride in diethyl ether to give 1-(o-acetylphenoxy)-2-hydroxy-3-isopropylaminopropane hydrochloride (12.0 g.), m.p. 147°–149°C.

Similarly prepared were:
1. DL-1-(o-Acetylphenoxy)-2-hydroxy-3-isopropylaminopropane p-toluenesulphonylhydrazone, m.p. 169°–172°C.
2. DL-1-(o-Acetylphenoxy)-2-hydroxy-3-isopropylaminopropane p-methoxybenzenesulphonylhydrazone hydrochloride, m.p. 176°–177°C.
3. DL-1-(o-Acetylphenoxy)-2-hydroxy-3-isopropylaminopropane p-nitrobenzenesulphonylhydrazone hydrochloride, m.p. 176°–177°C.
4. DL-1-(o-Acetylphenoxy)-2-hydroxy-3-isopropylaminopropane p-chlorobenzenesulphonylhydrazone hydrochloride, m.p. 181°–184°C.
5. DL-1-(o-Acetylphenoxy)-2-hydroxy-3-isopropylaminopropane m-chlorobenzenesulphonylhydrazone hydrochloride, m.p. 168°–170°C.
6. DL-1-(o-Acetylphenoxy)-2-hydroxy-3-isopropylaminopropane naphthalene-1-sulphonylhydrazone hydrochloride, m.p. 122°–125°C.
7. DL-1-(o-Acetylphenoxy)-2-hydroxy-3-isopropylaminopropane naphthalene2-sulphonylhydrazone hydrochloride, m.p. 80°–82°C.
8. DL-1-(o-Acetylphenoxy)-2-hydroxy-3-isopropylaminopropane 3-methylisothiazole4-sulphonylhydrazone dihydrochloride, m.p. 65°–70°C.

9. DL-1-(o-Acetylphenoxy)-2-hydroxy-3-isopropylaminopropane 4-phenoxybenzenesulphonylhydrazone dihydrochloride, m.p. 129°–133°C. (decomp.).

10. DL-1-(o-Acetylphenoxy)-2-hydroxy-3-isopropylaminopropane butane-1-sulphonylhydrazone, m.p. 102°–107°C.

11. DL-1-(o-Acetylphenoxy)-2-hydroxy-3-isopropylaminopropane phenylmethanesulphonylhydrazone, m.p. 112°–117°C.

12. DL-1(o-Acetylphenoxy)-2hydroxy-3-isopropylaminopropane p-dimethylaminobenzenesulphonylhydrazone hydrochloride hydrate, m.p. 60°–80°C.

13. DL-1-(o-Acetylphenoxy)-2-hydroxy-3-isopropylaminopropane p-cyanobenzenesulphonylhydrazone, m.p. 171°–173°C.

14. DL-1-(o-Acetylphenoxy)-2-hydroxy-3-isopropylaminopropane o-chlorobenzenesulphonylhydrazone hydrochloride, m.p. 183°–187°C.

15. DL-1-(o-Acetylphenoxy)-2-hydroxy-3-isopropylaminopropane p-bromobenzenesulphonylhydrazone hydrochloride, m.p. 198°–201°C.

16. DL-1-(o-Acetylphenoxy)-2-hydroxy-3-isopropylaminopropane p-acetamidobenzenesulphonylhydrazone hydrochloride, m.p. 85°–87°C. (decomp.).

17. DL-1-(o-Acetylphenoxy)-2-hydroxy-3-isopropylaminopropane p-hydroxybenzenesulphonylhydrazone hydrochloride, m.p. 102°–107°C.

The intermediate m-chlorobenzenesulphonylhydrazide for Compound (5) was prepared as follows:

60% Hydrazine hydrate (8.33 g.) was added slowly with stirring to a solution of m-chlorobenzenesulphonyl chloride (9.52 g.) in benzene (25 ml.) and stirring was continued for a further 2.5 hours. The solid was filtered off and was m-chlorobenzenesulphonylhydrazide, m.p. 60°–64°C.

The intermediate p-phenoxybenzenesulphonylhydrazide for Compound (9) was prepared as follows:

100% Hydrazine hydrate (3 ml.) was added dropwise with stirring and cooling to a solution of p-phenoxybenzenesulphonyl chloride (5.3 g.) in anhydrous ethanol (10 ml.). Stirring was continued for a further 3 hours, water was added, and the solid was filtered off and recrystallized from ethanol to give p-phenoxybenzenesulphonyl-hydrazide, m.p. 137.5°–139.5°C.

The intermediate p-dimethylaminobenzenesulphonylhydrazide for Compound (12) was prepared as follows:

100% Hydrazine hydrate (5 ml.) was added slowly with cooling to a solution of methyl p-dimethylaminobenzenesulphonate (1.33 g.) in dry benzene (10 ml.). The mixture was kept at room temperature for 4 days, sufficient dry methanol was added to give a clear solution, the mixture was refluxed for 3 hours, and the solvent evaporated in vacuo. Water was added to the residue and the mixture again evaporated in vacuo. The residue was triturated with diethyl ether and ethanol to give a solid, which was recrystallized from ethanol to give p-dimethylaminobenzenesulphonylhydrazide hydrate, m.p. 230°C.

The intermediate o-chlorobenzenesulphonylhydrazide for Compound (14) was prepared as follows:

o-Chlorobenzenesulphonyl chloride dissolved in an equal volume of methanol was added dropwise with stirring to an excess of hydrazine hydrate, keeping the temperature of the mixture below 20°C. Addition of water and cooling in ice gave a solid which was recrystallised from ethanol to give o-chlorobenzenesulphonylhydrazide, m.p. 101°–103°C.

EXAMPLE 13

A mixture of DL-1-(4-chloro-2-propionylphenoxy)-2-hydroxy-3-isopropylaminopropane hydrochloride (6.6 g.) and benzenesulphonyl hydrazide (3.44 g.) in anhydrous methanol (100 ml.) was refluxed for 6 hours. The reaction mixture was treated with charcoal, filtered, and concentrated under reduced pressure. The residue was treated with diethyl ether to give DL-1-(4-chloro-2-propionylphenoxy)-2-hydroxy-3-isopropylaminopropane benzenesulphonylhydrazone hydrochloride (8.5 g.), m.p. 85°–90°C.

The amine starting material was prepared as follows:

5-Chloro-2-hydroxypropiophenone (122 g.) was added to sodium methoxide in methanol [prepared from sodium (15.5 g.) and anhydrous methanol (1000 ml.)] and the mixture concentrated to dryness to afford the sodium salt of the phenol. The sodium salt was added during 1 hour to a refluxing mixture of epichlorohydrin (150 ml.) and anhydrous methanol (150 ml.) and refluxing was maintained for a further 3 hours. The reaction mixture was concentrated and then poured onto water to give a solid which was dissolved in ethyl acetate and dried (MgSO$_4$). Concentration under reduced pressure gave 1(4-chloro-2-propionyl-phenoxy)-2,3-epoxypropane (122 g.), m.p. 54°C.

A mixture of 1-(4-chloro-2-propionylphenoxy)-2,3-epoxypropane (48 g.), isopropylamine (100 ml.) and methanol (100 ml.) was refluxed for 24 hours. The reaction mixture was concentrated under reduced pressure and the residue treated with 2N hydrochloric acid (500 ml.) and ethyl acetate. The acid extract wes brought to pH 11 with 50% sodium hydroxide solution with cooling to give DL-1(4-chloro-2-propionylphenoxy)-2-hydroxy-3-isopropylaminopropane (31 g.), m.p. 76°–81°C. The hydrochloride was prepared by treatment with hydrogen chloride in diethyl ether.

EXAMPLE 14

A mixture of DL-1-(2-acetyl-4,6-dichlorophenoxy)-2-hydroxy-3-isopropylaminopropane hydrochloride (9.0 g.), benzenesulphonyl hydrazide (4.34 g.) and anhydrous methanol (100 ml.) was refluxed for 6 hours. The reaction solution was concentrated under reduced pressure and the residue was treated with diethyl ether to give DL-1-(2-acetyl-4,6-dichlorophenoxy)-2-hydroxy-3-isopropylaminopropane benzenesulphonylhydrazone hydrochloride (11.7 g.), m.p. 105°–106°C.

The amine starting material was prepared as follows:

A mixture of 3,5-dichloro-2-hydroxyacetophenone (110 g.), anhydrous potassium carbonate (37.4 g.), epichlorohydrin (200 g.) and anhydrous dimethylformamide (500 ml.) was heated in an atmosphere of nitrogen for 8 hours at 100°C. The reaction mixture was then cooled, poured onto water and extracted diethyl dietyl ether. The extract was dried (MgSO$_4$) and fractionally distilled to give 1-(2-acetyl-4,6-dichlorophenoxy)-2,3-epoxypropane (110 g.), b.p. 140°–150°C.

A mixture of the above epoxide (32 g.), isopropylamine (100 ml.) and anhydrous ethanol (50ml.) was refluxed for 7 days. The reaction solution was concentrated under reduced pressure and then poured onto 2N hydrochloric acid (150 ml.) and ethyl acetate (250 ml.). The acid extract was brought to pH 11 with 50% sodium hydroxide solution and extracted with diethyl ether. The extract was dried (MgSO$_4$), concentrated and the residue crystallised from light petroleum (b.p. 60°–80°C.) to give DL-1-(2-acetyl-4,6-dichlorophenoxy)-2-hydroxy-3-isopropylaminopropane (9.8 g.), m.p. 74°–75°C. The hydrochloride was prepared by treatment with hydrogen chloride in diethyl ether.

The following were prepared similarly:
1. DL-1-(2Acetyl-4-nitrophenoxy)-2-hydroxy-3-isopropylaminopropane benzenesulphonylhydrazone hydrochloride, m.p. 200°–202°C.

The amine starting material was prepared as described in Example 2.

2. DL-1-(2-Acetyl-4-chlorophenoxy)-2-hydroxy-3-isopropylaminopropane benzenesulphonylhydrazone hydrochloride, m.p. 208°–209°C.

The amine starting material was prepared as described in Example 2.

3. DL-1-(2-Acetyl-4,6-dichlorophenoxy)-2-hydroxy-3-isopropylaminopropane naphthalene-2-sulphonylhydrazone hydrochloride, m.p. 162°–164°C.

The amine starting material was prepared as described above.

4. DL-1-(2-Acetyl-4,6-dichlorophenoxy)-2-hydroxy-3-isopropylaminopropane naphthalene-1-sulphonylhydrazone hydrochloride, m.p. 172°C.

The amine starting material was prepared as described above.

5. DL-1-(2-Acetyl-5-chlorophenoxy)-2-hydroxy-3-isopropylaminopropane benzenesulphonylhydrazone hydrochloride, m.p. 185°–188°C.

The amine starting material was prepared as described in Example 2.

6. DL-1-(2Acetyl-4-phenylphenoxy)-2-hydroxy-3-isopropylaminopropane benzenesulphonylhydrazone hydrochloride, m.p. 205°–207°C.

The amine starting material was prepared as described in Example 2.

7. DL-1-(2-Acetyl-4,5-dichlorophenoxy)-2-hydroxy-3-isopropylaminopropane benzenesulphonylhydrazone hydrochloride, m.p. 220°–252°C.

The amine starting material was prepared as described in Example 2.

EXAMPLE 15

A mixture of DL-1-(o-acetylphenoxy)-2-hydroxy-3-isopropylaminopropane hydrochloride (21.56 g.), pyridine-4-carboxyhydrazide (10.27 g.) and anhydrous methanol (500 ml.) was refluxed until thin-layer chromatography showed that the reaction was complete. The reaction mixture was concentrated under reduced pressure and the residue treated with diethyl ether to give DL-1(o-acetylphenoxy)-2-hydroxy-3-isopropylaminopropane pyridine-4-carboxyhydrazone hydrochloride (28.0 g.) and m.p. 219°–225°C.

The compounds of the formula specified hereafter in the following table were prepared in a similar manner. The free bases were obtained by treating the hydrochlorides with aqueous sodium hydroxide solution, the di- or tri-hydrochlorides prepared by treating the monohydrochloride or the free base with hydrogen chloride in diethyl ether and the acetate and oxalate prepared by treating the free base with acetic or oxalic acid in methanol.

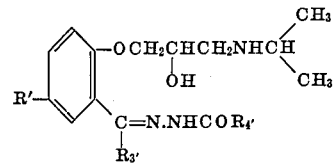

| Compound | R' | R$_{3'}$ | R$_{4'}$ | M.P. (°C.) | Remarks |
|---|---|---|---|---|---|
| 1 | H | CH$_3$ | CH$_3$ | 183–186 | Monohydrochloride. |
| 2 | H | CH$_3$ | –⟨phenyl⟩ | 70–75 | Dihydrochloride hemihydrate. |
| 3 | H | CH$_3$ | –⟨phenyl⟩–CH$_3$ | 105–110 | Monohydrochloride. |
| 4 | H | CH$_3$ | –⟨phenyl⟩–Cl | 150–155 | Do. |
| 5 | H | CH$_3$ | –⟨phenyl, Cl⟩ | 126–128 | Do. |
| 6 | H | CH$_3$ | –⟨phenyl, HO⟩ | 95 | Do. |
| 7 | H | CH$_3$ | –⟨phenyl, OH⟩ | 191–192 | Dihydrochloride. |
| 8 | H | CH$_3$ | –⟨phenyl⟩–OH | 219–222 | Do. |

—Continued

| Compound | R' | R₃' | R₄' | M.P. (°C.) | Remarks |
|---|---|---|---|---|---|
| 9 | H | CH₃ | —C₆H₄—NH₂ | ¹115 | Trihydrochloride hemihydrate. |
| 10 | H | CH₃ | —C₆H₄—SO₂NH₂ | 126 | Monohydrochloride. |
| 11 | H | CH₃ | —C₆H₄—NO₂ | 118–120 | Do. |
| 12 | H | CH₃ | —C₆H₄—NHCOCH₃ | 193–196 | Dihydrochloride hydrate. |
| 13 | H | CH₃ | —C₆H₄—NHSO₂CH₃ | 191–195 | Dihydrochloride hemihydrate. |
| 14 | H | CH₃ | —C₆H₃(Cl)(Cl) (2,4-dichlorophenyl) | 137–139 | Monohydrochloride. |
| 15 | H | CH₃ | —C₆H₃(OH)(OH) (2,5-dihydroxyphenyl) | 135 | Do. |
| 16 | H | CH₃ | —C₆H₃(OH)(OH) (2,4-dihydroxyphenyl) | 94–96 | Do. |
| 17 | H | CH₃ | —C₆H₃(OH)(OH) (3,4-dihydroxyphenyl) | 110–115 | Do. |
| 18 | H | CH₃ | —C₆H₃(OH)(OH) | 197–200 | Dihydrochloride hemihydrate. |
| 19 | H | CH₃ | —C₆H₂(Cl)(OCH₃)(Cl) | 194–195 | Monohydrochloride. |
| 20 | Cl | CH₃ | —C₆H₄—OH | 170–173 | Acetate. |
| 21 | CH₃O | CH₃ | —C₆H₄—NO₂ | 161–163 | Free base. |
| 22 | H | CH₃ | α-Naphthyl | 214–215 | Monohydrochloride. |
| 23 | H | CH₃ | 6-hydroxy-2-naphthyl | 135–137 | Do. |
| 24 | H | CH₃ | 1-hydroxy-2-naphthyl | 224–226 | Do. |
| 25 | H | CH₃ | 4-biphenyl | 198–199 | Do. |
| 26 | H | CH₃ | isothiazolyl | 131–133 | Do. |
| 27 | H | CH₃ | 2-pyridyl | 85 | Monohydrochloride (hemihydrate). |
| 28 | H | CH₃ | 3-pyridyl | ¹73 | Monohydrochloride. |

—Continued

| Compound | R' | R₃' | R₄' | M.P. (°C.) | Remarks |
|---|---|---|---|---|---|
| 29 | H | CH₂Ph | -pyridyl | 132–133 | Do. |
| 30 | H | CH₂CH₂Ph | -pyridyl | 155–158 | Do. |
| 31 | H | CH₃ | —CH₂—cyclohexyl | 118–122 | Monohydrochloride (cis-isomer). |
| 32 | H | CH₃ | —CH₂—cyclohexyl | 177–180 | Monohydrochloride (trans-isomer). |
| 33 | H | CH₃ | —CH₂O—phenyl | 142–145 | Oxalate. |
| 34 | H | CH₃ | —CH₂—C₆H₄—Br | 205–207 | Monohydrochloride. |
| 35 | H | CH₃ | —CH₂—C₆H₄—Cl | 203–206 | Do. |
| 36 | H | CH₃ | —CH₂—C₆H₄—OCH₃ | 172–173.5 | Do. |
| 37 | H | CH₃ | —CH₂—C₆H₄—NO₂ | 210–213 | Do. |
| 38 | H | CH₃ | —CH₂—C₆H₃(OCH₃)(OCH₃) | ¹39 | Do. |
| 39 | H | CH₃ | —CH₂—C₆H₄—Cl | 124–126 | Free base. |
| 40 | H | CH₃ | 2,4-dihydroxypyrimidinyl | ¹230–233 | Monohydrochloride monohydrate. |

¹ Decomposition.

The intermediate 3,5-dihydroxybenzhydrazide for Compound (18) was prepared as follows:

A mixture of methyl 3,5-dihydroxybenzoate (25g), 100% hydrazine hydrate (50ml) and dry ethanol (100ml) was refluxed for 5 hours and the solvents were evaporated. The residue was dissolved in water and brought to pH 7 with 2N hydrochloric acid. The precipitated 3,5-dihydroxybenzhydrazide, m.p. 265°–266°C (decomp.), was filtered off and dried.

The intermediate 3,5-dichloro-4-methoxybenzhydrazide for Compound (19) was prepared as follows:

A mixture of methyl 3,5-dichloro-4-methoxybenzoate (4.7g), 100% hydrazine hydrate (3.0ml) and ethanol (20ml) was refluxed for 1 hour and cooled. The solid was filtered off and recrystallised from a large volume of ethanol to give 3,5-dichloro-4-methoxybenzhydrazide, m.p. 214°–215°C.

The intermediate amines for Compounds (20, 21, 29 and 30) were prepared as described in Example 2.

The intermediate o-chlorophenylacethydrazide for Compound (39) was prepared as follows:

A mixture of methyl o-chlorophenylacetate (31.6g), 100% hydrazine hydrate (44ml) and dry ethanol (88ml) was refluxed for 5 hours and the mixture was cooled to 0°C. The solid was filtered off and recrystallised from ethanol to give o-chlorophenylacethydrazide, m.p. 153°–155.5°C.

EXAMPLE 16

A solution of DL-1-(4-chloro-2-propionylphenoxy)-2-hydroxy-3-(1-methyl-3-phenylpropylamino)propane (10g) in ethanol (150ml) was refluxed for 12 hours with a solution of hydroxylamine hydrochloride (5g) in water (100ml) containing sufficient sodium acetate to bring the solution to pH 6. The ethanol was evaporated, and the aqueous residue extracted three times with ethyl acetate. The extract was dried (MgSO₄) and evaporated, and the residual oil was dissolved in diethyl ether. Dry hydrogen chloride gas was passed into the solution to give a precipitate of DL-1-(4-chloro-2-propionylphenoxy)-2-hydroxy-3-(1-methyl-3-phenylpropylamine)propane oxime hydrochloride hydrate (2.3g), m.p. 65°C (decomp.).

The amine starting material was prepared as follows:

A mixture of 1(4-chloro-2-propionylphenoxy)-2,3-epoxypropane (48g), prepared as described in Example 13, 3-amino-1-phenylbutane (30g) and anhydrous methanol (150ml) was refluxed for 24 hours. The methanol was evaporated and the residue heated at 120°C for 12 hours and then at 150°C for 3 hours. The product was cooled, treated with light petroleum (b.p. 60°–80°C) containing a trace of ethyl acetate, and the mixture kept at 0°C overnight. The solid which was formed was filtered off and washed with a small volume of diethyl ether to give DL-1-(4-chloro-2-propionylphenoxy)-2-hydroxy-3-(1-methyl-3-phenylpropylamino)propane (11.5g), m.p. 81°–85°C.

EXAMPLE 17

A mixture of DL-1-(4-chloro-2-propionylphenoxy)-2-hydroxy-3-(1-methyl-3-phenylpropylamino)propane (1.9g; prepared as described in Example 16), benzenesulphonylhydrazide hydrochloride (1.05g) and anhydrous methanol (100ml) was refluxed for 6 hours. The solution was evaporated in vacuo, and the residue evaporatd in vacuo after the addition of several successive portions of benzene. The residue was treated with diethyl ether containing a trace of ethanol and kept at 0°C overnight to give DL-1-(4-chloro-2-propionylphenoxy)-2-hydroxy-3-(1-methyl-3-phenylpropylamino)propane benzenesulphonylhydrazone hydrochloride (2g), m.p. 114°–117°C.

EXAMPLE 18

DL-1(o-Acetylphenoxy)-3-isopropylaminopropane (4.5g), prepared as described in Example 2, was dissolved in a mixture of ethanol (10ml) and concentrated nitric acid (10ml). To this solution was slowly added aminoquanidine hydrogen carbonate (4.5g), and the mixture kept at room temperature overnight. The precipitated yellow solid was filtered off and recrystallised from 2N nitric acid to give DL-1-(o-acetylphneoxy)-2-hydroxy-3-isopropylaminopropane quanylhydrazone trinitrate (1g), m.p. 180°–181°C.

EXAMPLE 19

DL-1(o-Acetylphenoxy)-3-cyclohexylamino-2-hydroxypropane (2.9g) was dissolved in chloroform (25ml). The solution was cooled in ice-water, dry hydrogen chloride gas was passed in for 20 minutes, and the chloroform was evaporated. The residue was treated with diethyl ether to give DL-1(o-acetylphenoxy)-3-cyclohexylamino-2-hydroxypropane hydrochloride, m.p. 153°–154°C. This was dissolved in anhydrous ethanol (40ml), benzenesulphonylhydrazide (1.72g) was added, and the mixture was refluxed for 7.5 hours, and set aside at room temperature overnight. The white solid which separated was filtered off, washed with anhydrous diethyl ether, and dried in vacuo over phosphoric oxide to give DL-1-(o-acetylphenoxy)-3-cyclohexylamino-2-hydroxypropane benzenesulphonylhydrazone hydrochloride (4.35g), m.p. 194.5°–197°C (decomp.).

The amine starting material was prepared as follows:
A mixture of 1(o-acethyphenoxy)-2,3-epoxypropane (10g), cyclohexylamine (10ml), and anhydrous ethanol (35ml) was refluxed for 2 days. The solvent was removed in vacuo, and the residue treated wtih diethyl ether to give DL-1-(o-acetylphenoxy)-3-cyclohexylamino-2-hydroxypropane (8.0g), m.p. 88.5°C.

EXAMPLE 20

A mixture of DL-1-(o-acetylphenoxy)-3-benzylamino-2-hydroxy-propane hydrochloride (6.18g), benzenesulphonylhydrazide (2.44g) and anhydrous methanol (35ml) was refluxed for 2.5 hours. The solvent was evaporated, and the residue evaporated after the addition of several successive portions of benzene. The residue was treated with diethyl ether and then several times with boiling ethyl acetate to give DL-1-(o-acetylphenoxy)-3-benzylamino-2-hydroxypropane benzenesulphonyl-hydrazone hydrochloride (2.73g), m.p. 175°–178°C.

The amine starting material was prepared as follows:
A mixture of 1-(o-acetylphenoxy)-2,3-epoxypropane (10g), benzylamine (35ml) and anhydrous methanol (35ml) was allowed to stand at room temperature in an atmosphere of nitrogen for 24 hours. The methanol and the excess of benzylamine were removed in vacuo and the residue was dissolved in 2N hydrochloric acid and extracted five times with chloroform. The combined extracts were washed with a little water, dried (MgSO$_4$) and evaporated. The residue was washed several times with boiling ethyl actate and then washed with light petroleum (b.p. 40–60°C) to give DL-1-(o-acetylphenoxy)-3-benzylamino-2-hydroxypropane hydrochloride (11.1g), m.p. 140°–144°C.

EXAMPLE 21

A mixture of 1-(o-acetylphenoxy)-2,3-epoxypropane (19.2g), semicarbazide hydrochloride (11.16g), anhydrous sodium acetate (16.4g) and anhydrous dimethylformamide (75ml) was stirred at room temperature for 18 hours. The solvent was evaporated in vacuo and the residue treated with water and extracted three times with chloroform. The combined extracts were dried (MgSO$_4$) and evaporated. The resultant oil (24.9g) was refluxed with isopropylamine (100ml) and anhydrous ethanol (100ml) for 4 hours. Evaporation in vacuo gave an oil, which on treatment with diethyl ether and isopropanol gave DL-1-(o-acetylphenoxy) -2-hydroxy-3-isopropylaminopropane semicarbazone hydrochloride (3g), m.p. 194°C. The filtrate was evaporated in vacuo, and the resultant oil was dissolved in a small amount of anhydrous ethanol. A solution of hydrogen chloride in anhydrous diethyl ether was added, to give a further quantity (12.3g) of the above semicarbazene hydrochloride, m.p. 188°–190°C.

EXAMPLE 22

A mixture of 1-(o-acetylphenoxy)-2,3-epoxypropane (1.92g), benzenesulphenylhydrazide (1.72g) and anhydrous ethanol (40ml) was allowed to stand at room temperature for 24 hours. To the mixture was then added isopropylamine (40ml) with cooling, and the mixture was allowed to stand at room temperature for a further 24 hours. Evaporation in vacuo gave an oil, which was azeotropically evaporated with benzene. The residue was triturated with anhydrous diethyl ether, and the resulting solid purified by boiling with benzene, to give DL-1-(o-acetylphenoxy)-2-hydroxy-3-isopropylaminopropane benzenesulphenylhydrazone, m.p. 161°–162°C.

EXAMPLE 23

A mixture of 1-(o-acetylphenoxy)-2,3-epoxypropane (1.92g) and p-chlorobenzenesulphenylhydrazide (2.06g) in anhydrous ethanol (40ml) was allowed to stand at room temperature for 24 hours. To the mixture was then added isopropylamine (40ml) with cooling, and the mixture was left at room temperature for a further 24 hours and evaporated in vacuo. The residue was azeotropically concentrated with benzene to remove any ethanol or water. On standing the benzene solution deposited a solid, which was recrystallised from ethanol to give DL-1-(o-acetylphenoxy)-2-hydroxy-3-isopropylaminopropane p-chlorobenzenesulphenylhydrazone, m.p. 161°–162°C.

EXAMPLE 24

A mixture of 1-(o-acetylphenoxy)-2,3-epoxypropane (9.6g.), semicarbazide hydrochloride (5.58g), and dry ethanol (100ml.) was refluxed for 5 hours. Evaporation gave an oil, which was refluxed with isopropylamine (50ml.) and dry ethanol (100ml.) for 6 hours. The solution was evaporated in vacuo and the residue evaporated twice with benzene. The residue was recrystallized from diethyl ether containing a small amount of isopropanol to give DL-1-(o-acetylphenoxy)-2-hydroxy-3-isopropylaminopropane semicarbazone hydrochloride, m.p. 194°–196°C.

EXAMPLE 25

A mixture of DL-1-(o-acetylphenoxy)-2-hydroxy-3-(N-isopropylmethylamino)propane di-p-tolueyltartrate (1.3g), benzenesulphenylhydrazide (0.34g.), and dry ethanol was refluxed for 2 hours. After evaporation, followed by evaporation with benzene, the residue triturated with diethyl ether to give DL-1-(o-acetylphenoxy)-2-hydroxy-3-(N-isopropylmethylamino)propane benzenesulphenylhydrazone di-p-toluoyltartrate, m.p. 60°C (decomp.).

The intermediate DL-1-(o-acetylphenoxy)-2-hydroxy-3-(N-isopropylmethylamino)propane di-p-toluoyltartrate was prepared as follows:-

A mixture of 1-(o-acetylphenoxy)-2,3-epoxypropane(60g.) and N-isopropylmethylamine (20g.) was refluxed until thin-layer chromatography showed that the reaction was complete, and dissolved in chloroform. The solution was treated with an excess of dry hydrogen chloride, the precipitate was treated with 2N sodium hydroxide, and the mixture extracted four times with diethyl ether. The combined extracts were dried and treated with a solution of di-p-tolwoyltartaric acid (17.3g.) in diethyl ether. The DL-1-(o-acetylphenoxy)-2-hydroxy-3-(N-isopropylmethylamine)propane di-p-toluoyltartrate was filtered off.

EXAMPLE 26

A mixture of DL-1-(o-acetylphenoxy)-2-hydroxy-3-(1-phenylethylamino)propane hydrochloride (5.25g.), benzenesulphenylhydrazide (2.58g.) and dry methanol (100ml.) was refluxed for 8 hours. The solution was evaporated and the residue triturated with dry diethyl ether. The solid so obtained was dissolved in dry methanol and dry hydrogen chloride was passed into the solution. The solvent was evaporated, and the residue triturated with diethyl ether. The solid was suspended in ethyl acetate, and the mixture shaken with aqueous sodium hydrogen carbonate solution. The organic layer was dried and evaporated, and the residue slowly crystallized to give DL-1-(o-acetylphenoxy)-2-hydroxy-3-(1-phenylethylamino)propane benzenesulphenylhydrazene, m.p. 101°–105°C (decomp.).

The intermediate DL-1-(o-acetylphenoxy)-2-hydroxy-3-(1-phenylethylamino)propane hydrochloride was prepared as follows:-

A mixture of 1-(o-acetylphenoxy)-2,3-epoxypropane (17.3g.), 1-phenylethylamine (10.9g.), and dry methanol (150ml.) was refluxed for 36 hours, and the solution evaporated. The residue was dissolved in diethyl ether and extracted with 2N hydrochloric acid. The aqueous layer was made alkaline, and extracted with chloroform. The extract was dried and evaporated, and the residue was treated with a solution of hydrogen chloride in diethyl ether. The solid obtained was recrystallized from isopropanol to give DL-1-(o-acetylphenoxy)-2-hydroxy-3-(1-phenylethylamino)propane hydrochloride, m.p. 136°–138°C.

EXAMPLE 27

Salicylaldehyde benzyloxime (23.4 g.) in ethanol (100 ml.) was added to a solution of sodium ethoxide in ethanol (from 2.3 g. of sodium and 100 ml. of ethanol) and the resulting solution was heated under reflux. Epichlorhydrin (24 g.) was added to the refluxing solution and the reaction mixture was then refluxed for one hour. The solution was cooled and the precipitated sodium chloride was filtered off. The solution was concentrated under reduced pressuure, and the residue was treated with water (250 ml.). The mixture was extracted with chloroform and the dried extract (MgSO$_4$) was concentrated to an oil which was treated with ethanol (100 ml.) and isopropylamine (100 ml.) and kept at room temperature for 12 hours. The reaction mixture was concentrated to an oil which was treated with diethyl ether (100 ml.) and cooled to 0°C. to give DL-1-(o-formylphenoxy)-2-hydroxy-3-isopropylaminopropane O-benzyloxime (13 g.), m.p. 84°C.

The salicylaldehyde benzyloxime used as starting material was prepared as follows:

Salicylaldehyde (30 g.) and benzyloxyamine hydrochloride (40 g.) in ethanol (400 ml.) were refluxed for 7 hours. The solution was concentrated to half volume and cooled to give salicylaldehyde benzyloxime (45 g.),m.p. 63°–64°C.

EXAMPLE 28

Salicylaldehyde benzyloxime (11.35 g.) was added to a solution of sodium ethoxide in ethanol (from 1.15 g. of sodium and 100 ml. of dry ethanol) and the resulting solution was heated under reflux. Epichlorhydrin (10 g.) was added to the refluxing solution and the reaction mixture was heated for a further one hour. The solution was cooled and the precipitated sodium chloride was filtered off. The solution was concentrated under reduced pressure and the residue was treated with water (200 ml.). The mixture was extracted with chloroform and the dried (MgSO$_4$) extract was concentrated to an oil which was dissolved in ethanol and treated with morpholine (6 g.) and kept at room temperature for 18 hours. The reaction mixture was concentrated to dryness and treated with ethanol and ethereal hydrogen chloride to give DL-1-(o-formylphenoxy)-2-hydroxy-3-morpholinolinopropane O-benzyloxime hydrochloride (9.5 g.), m.p. 149°–151°C.

EXAMPLE 29

DL-1-(o-Acetylphenoxy)-2-hydroxy-3-morpholinopropane(2.79 g.) and benzyloxyamine hydrochloride (1.595 g.) in ethanol (100 ml.) were refluxed for 7 hours. The reaction mixture was then evaporated to dryness under reduced pressure and the residue was triturated with petroleum ether (b.p. 40°–60°C.) to give DL-1-(o-acetylphenoxy)-2-hydroxy-3-morpholinopropane O-benzyloxime hydrochloride (2.7 g.), m.p. 137°–139°C.

The starting material was prepared as follows:-

1-(o-Acetylphenoxy)-2,3-epoxypropane (7. g.), morpholine (3.2 g.), and ethanol (100 ml.) were refluxed for 7 hours. The reaction mixture was then concentrated to dryness under reduced pressure and the residue was triturated with petroleum ether (b.p. 60°–80°C.) to give DL-1-(o-acetylphenoxy)-2-hydroxy-3-morpholinopropane (9g.), m.p. 64°–66°C.

EXAMPLE 30

Salicylaldehyde benzyloxime (11.7g.) in ethanol (50ml.) was added to a solution of sodium ethoxide in ethanol (from 1.15 g. of sodium in 50ml. of ethanol) and the resulting solution was heated under reflux. Epichlorhydrin (12 g.) was added to the refluxing solution and the reaction mixture was then refluxed for one hour. The solution was cooled and the precipitated sodium chloride was filtered off. The solution was concentrated under reduced pressure, and the residue was treated with water (125 ml.). The mixture was extracted with chloroform and the dried extract (MgSO$_4$) was concentrated to an oil which was treated with ethanol (50 ml.) and diethylamine (10 g.) and kept at room temperature for 12 hours. The reaction mixture was concentrated to an oil which was treated with an excess of anhydrous hydrogen chloride in diethyl ether (75 ml.) and cooled to 0°C to give DL-1-(o-formylphenoxy)-2-hydroxy-3-diethylaminopropane O-benzyloxime hydrochloride (6.5 g.) m.p. 96°–98°C.

EXAMPLE 31

DL-1-(o-Acetylphenoxy)-2-hydroxy-3-diethylaminopropane hydrochloride 3.0 g.) was added to a solution of hydroxylamine hydrochloride (0.7 g.) in ethanol (100 ml.) and refluxed for 12 hours. The reaction mixture was then concentrated under reduced pressure and the residual oil was treated with water and ethylacetate. The aqueous extract was brought to ph 9 with 2N-sodium hydroxide solution, and extracted with ethyl acetate. The extract was dried, concentrated and treated with petroleum ether (b.p. 40°–60°C) to give DL-1-(o-acetylphenoxy)-2-hydroxy-3-diethylaminopropane oxime (2.0 g.), m.p. 98°–100°C.

The DL-1-(o-acetylphenoxy)-2-hydroxy-3-diethylaminopropane hydrochloride was prepared as follows:-

1-(o-Acetylphenoxy)-2,3-epoxypropane (30 g.), diethylamine (42.5 g.) and ethanol (200 ml.) were refluxed for 6 hours. The reaction mixture was then concentrated under reduced pressure and the residual oil treated with 2N-hydrochloric acid and diethyl ether. The acid extract was brought to pH 11 with 50% sodium hydroxide solution, and extracted with chloroform. The extract was dried and concentrated to dryness. The residual oil was treated with ethanol (100 ml.) and concentrated hydrochloric acid (5 ml)and concentrated to dryness. The residual oil was treated with ether to give a solid which was filtered off and recrystallised from ethyl acetate and acetone to give DL-1-(o-acetylphenoxy)-2-hydroxy-3-diethylaminopropane hydrochloride (17 g.) m.p. 87°–89°C.

The 1-(o-acetylphenoxy)-2,3-epoxypropane was prepared by the method of Beasley, Petrow and Stephenson, *J.Pharm.Pharmacol.*, 1958 10, 47.

EXAMPLE 32

1-(o-Formylphenoxy)-2,3-epoxypropane O-benzyloxime (15 g) was dissolved in ethanol (250 ml) and mixed with 40% aqueous dimethylamine (100 ml) and the reaction mixture was kept at room temperature for 70 hours. The mixture was then concentrated to dryness and the residue was treated with 2N hydrochloric acid. The acid extract was treated with charcoal, filtered, brought to pH 10 with 40% aqueous sodium hydroxide and then extracted with diethyl ether. The ethereal extract was dried over magnesium sulphate and treated with hydrogen chloride to give DL-1-(o-formylphenoxy)-2-hydroxy-3-dimethylaminopropane O-benzyloxime hydrochloride (13 g), m.p. 132°–134°C.

The 1-(o-formylphenoxy)-2,3-epoxypropane O-benzyloxime used as starting material in the above preparation was obtained as follows:-

A mixture of salicylaldehyde O-benzyloxime (45.5 g) and epichlorhydrin (92.5 g) was heated under reflux with vigorous stirring while aqueous sodium hydroxide (8.34 g of sodium hydroxide in 20.8 ml. of water) was added during 4 hours. The mixture was refluxed for a further hour and then concentrated to dryness. The residue was treated with water and extracted with chloroform. The chloroform extract was concentrated to dryness and the residue recrystallised from isopropanol to give 1-(o-formylphenoxy)-2,3-epoxypropane O-benzyloxime (40.2 g), m.p. 80°–82°C.

Salicylaldehyde O-benzyloxime may be prepared by the following procedure:-

A mixture of salicylaldehyde (30 g) and benzyloxyamine hydrochloride (40 g) in ethanol (400 ml.) was heated under reflux for 7 hours. The solution was concentrated to half volume and cooled to give salicylaldehyde benzyloxime (45 g), m.p. 63°–64°C.

EXAMPLE 33

A mixture of 1-(o-formylphenoxy)-2,3-epoxypropane O-benzyloxime (7 g) (prepared as described in Example 32), diethanolamine (2.62 g) and ethanol (100 ml) was warmed to 60°C. and then kept at room temperature for 18 hours. The mixture was concentrated to dryness and extracted with diethyl ether. The ethereal extract was dried over magnesium sulphate and concentrated to dryness. The residue was dissolved in ethyl acetate and then treated with hydrogen chloride to give DL-1-o-formylphenoxy)-2-hydroxy-3-di-(2-hydroxyethyl)aminopropane O-benzyloxime hydrochloride (5 g), m.p. 119°–120°C.

Proceeding in a similar manner but using 15 g. of 1-(o-formylphenoxy)-2,3-epoxypropane O-benzyloxime and replacing the diethanolamine by di-n-propylamine (50 ml.), there was obtained DL-1-(o-formylphenoxy)-2-hydroxy-3-di-n-propylaminopropane O-benzyloxime hydrochloride (10 g), m.p. 85°–87°C.

The present invention includes within its scope pharmaceutical compositions which comprise at least one of the benzene derivatives of general formula I, or nontoxic acid addition salts thereof, in association with a pharmaceutically-acceptable carrier or coating. In clinical practice the compounds of the present invention will normally be administered orally or parenterally.

Solid compositions for oral administration include compressed tablets, pills, powders and granules. In such solid compositions, one or more of the active compounds is, or are, admixed with at least one inert diluent such as starch, sucrose or lactose. The compositions may also comprise, as is normal practice, additional substances other than inert diluents, e.g. lubricating agents such as magnesium stearate.

Liquid compositions for oral administration include pharmaceutically-acceptable emulsions, solutions, suspensions, syrups and elixirs containing inert diluents commonly used in the art such as water and liquid paraffin. Besides inert diluents such compositions may also comprise adjuvants, such as wetting and suspending agents, and sweetening, flavouring, perfuming and preserving agents. The compositions according to the invention for oral administration also include capsules of absorbable material, such as gelatin, containing one or more of the active substances with or without the addition of diluents or excipients.

Preparations according to the invention for parenteral administration include sterile aqueous, aqueous-organic, and organic solutions, suspensions and emulsions. Examples of organic solvents or suspending media are propylene glycol, polyethylene glycol, vegetable oils such as olive oil and injectable organic esters such as ethyl oleate. These compositions may also contain adjuvants such as stablising, preserving, wetting, emulsifying and dispersing agents. They may be sterilised by, for example, filtration through a bacteria-retaining filter, by incorporation in the compositions of sterilising agents, by irradiation or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. obviously, several unit dosage forms may be administered at about the same time. The dose employed depends upon the desired therapeutic effect, the route of administration and the duration of the treatment. In the adult, the doses are generally between 1 and 10 mg./kg body weight per day by oral administration.

The following Examples illustrate pharmaceutical compositions according to the invention.

EXAMPLE 34

Tablets of the formula:-

| | | |
|---|---|---|
| DL-1-(o-acettkogebixt)-2-hydroxy-3-isopropylaminopropane oxime | 20 | mg. |
| lactose | 49.5 | mg. |
| starch | 20 | mg. |
| dextrin | 20 | mg. |
| magnesium stearate | 0.5 | mg. | are prepared by intimately mixing the amine, lactose, starch and dextrin and passing the mixture through a 60-mesh British Standard sieve.

After addition of the magnesium stearate, the mixture is granulated to a suitable size and the granules compressed to form tablets.

EXAMPLE 35

An injectable solution of the following composition:-

| | |
|---|---|
| DL-1-(o-acetylphenoxy)-2-hydroxy-3-isopropyl-aminopropane semicarbazone dihydrochloride | 2.5 g. |
| distilled water | up to 100 ml. | was prepared by dissolving the amine hydrochloride in the distilled water. The solution was filtered and filled into ampoules which were sterilised in an autoclave.

EXAMPLE 36

Tablets of the formula:-

| | | |
|---|---|---|
| DL-1-(o-formylphenoxy)-2-hydroxy-3-isopropyl-aminopropane O-benzyloxime | 20 | mg. |
| lactose | 49.5 | mg. |
| starch | 20 | mg. |
| dextrin | 20 | mg. |
| magnesium stearate | 0.5 | mg. | were prepared by intimately mixing appropriate quantities of the amine, lactose, starch and dextrin and passing the mixture through a 60-mesh British Standard sieve. After addition of the magnesium stearate, the mixture was granulated to a suitable size and the granules compressed to form tablets of the above composition.

The DL-1-(o-formylphenoxy)-2-hydroxy-3-isopropylaminopropane O-benzyloxime may be replaced by an equal weight of DL-1-(o-formylphenoxy)-2-hydroxy-3-dimethylaminopropane O-benzyloxime.

We claim:

1. An oxime of the formula:

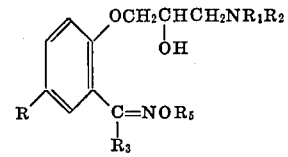

wherein R is hydrogen or phenyl, $R_1$ is hydrogen, alkyl of up to 6 carbon atoms, or hydroxyalkyl of up to 6 carbon atoms, $R_2$ is alkyl of up to 6 carbon atoms or hydroxyalkyl of up to 6 carbon atoms, or $R_1$ and $R_2$ together with the nitrogen to which they are attached represent morpholino, $R_3$ is hydrogen or alkyl of up to 6 carbon atoms, and $R_5$ is hydrogen or phenylalkyl of up to 6 carbon atoms in the alkyl residue, and non-toxic acid addition salts thereof.

2. An oxime according to claim 1 wherein $R_1$ and $R_2$ are both methyl, or propyl or 2-hydroxyethyl, $R_3$ is hydrogen and $R_5$ is benzyl, and non-toxic acid addition salts thereof.

3. An oxime according to claim 1 selected from the class consisting of DL-1-(o-acetylphenoxy)-2-hydroxy-3-isopropylaminopropane O-benzyloxime, and non-toxic acid addition salts thereof.

4. An oxime according to claim 1 selected from class consisting of DL-1-(o-formylphenoxy)-2-hydroxy-3-isopropylaminopropane O-benzyloxime, and non-toxic acid addition salts thereof.

5. An oxime according to claim 1 selected from the class consisting of DL-1-(o-formylphenoxy)-2-hydroxy-3-morpholinopropane O-benzyloxime, and non-toxic acid addition salts thereof.

6. An oxime according to claim 1 selected from the class consisting of DL-1-(o-acetylphenoxy)-2-hydroxy-3-morpholinopropane O-benzyloxime, and non-toxic acid addition salts thereof.

7. An oxime according to claim 1 selected from the class consisting of DL-1-(o-formylphenoxy)-2-hydroxy-3-diethylaminopropane O-benzyloxime, and non-toxic acid addition salts thereof.

8. An oxime according to claim 1 selected from the class consisting of DL-1-(o-acetylphenoxy)-2-hydroxy-3-diethylaminopropane oxime, and non-toxic acid addition salts thereof.

9. An oxime according to claim 1 selected from the class consisting of DL-1-(o-formylphenoxy)-2-hydroxy-3-dimethylaminopropane O-benzyloxime, and non-toxic acid addition salts thereof.

10. An oxime according to claim 1 selected from the class consisting of DL-1-(o-formylphenoxy)-2-hydroxy-3-di-n-propylaminopropane O-benzyloxime, and non-toxic acid addition salts thereof.

11. An oxime according to claim 1 selected from the class consisting of DL-1-(o-formylphenoxy)-2-hydroxy-3-di(2-hydroxyethyl)aminopropane O-benzyloxime and non-toxic acid addition salts thereof.

12. An oxime according to claim 1 selected from the class consisting of DL-1-(2-acetyl-4-phenylphenoxy)-2-hydroxy-3-isopropylaminopropane oxime and non-toxic acid addition salts thereof.

13. An oxime according to claim 1 wherein R is hydrogen, $R_1$ and $R_2$ are both methyl, ethyl or n-propyl, or one of $R_1$ and $R_2$ is hydrogen and the other is isopropyl, or $R_1$ and $R_2$ together with the nitrogen to which they are attached represent morpholino, $R_3$ is hydrogen or methyl, and $R_5$ is hydrogen or benzyl, and non-toxic acid addition salts thereof.

* * * * *